(12) United States Patent
Taniuchi

(10) Patent No.: US 8,619,294 B2
(45) Date of Patent: Dec. 31, 2013

(54) SERVER COMPUTER AND IMAGE FORMING APPARATUS FOR FORMING AN IMAGE BASED ON IMAGE DATA STORED ON SERVER COMPUTER

(75) Inventor: Toshiyuki Taniuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 488 days.

(21) Appl. No.: 12/909,382

(22) Filed: Oct. 21, 2010

(65) Prior Publication Data

US 2011/0096359 A1 Apr. 28, 2011

(30) Foreign Application Priority Data

Oct. 22, 2009 (JP) .................................. 2009-243057

(51) Int. Cl.
*G06F 3/12* (2006.01)
*G06K 15/00* (2006.01)

(52) U.S. Cl.
USPC ........................................ 358/1.15; 358/1.14

(58) Field of Classification Search
USPC ........ 358/1.1, 1.13, 1.14, 1.15, 1.9, 500, 474; 709/203; 705/52, 330; 707/627, 706
See application file for complete search history.

(56) References Cited

U.S. PATENT DOCUMENTS

| | | | |
|---|---|---|---|
| 6,471,878 B1 * | 10/2002 | Greene et al. | 216/13 |
| 7,591,415 B2 * | 9/2009 | Jesme | 235/380 |
| 8,134,734 B2 * | 3/2012 | Greene | 358/1.15 |
| 8,314,963 B2 * | 11/2012 | Park | 358/1.15 |
| 2004/0223186 A1 | 11/2004 | Ito | |
| 2005/0029350 A1 * | 2/2005 | Jusas et al. | 235/451 |
| 2005/0152544 A1 * | 7/2005 | Kizawa | 380/55 |
| 2006/0029412 A1 | 2/2006 | Kato et al. | |
| 2007/0081186 A1 | 4/2007 | Numata | |
| 2007/0242301 A1 * | 10/2007 | Tsuchie et al. | 358/1.14 |
| 2009/0296140 A1 * | 12/2009 | Sugiyama et al. | 358/1.15 |

FOREIGN PATENT DOCUMENTS

| | | |
|---|---|---|
| CN | 1551008 A | 12/2004 |
| JP | 2002-144676 A | 5/2002 |
| JP | 2003-341190 A | 12/2003 |
| JP | 2005-103924 | 4/2005 |
| JP | 2006-047765 | 2/2006 |
| JP | 2007-105937 | 4/2007 |
| JP | 2009-234106 A | 10/2009 |

* cited by examiner

*Primary Examiner* — Gabriel Garcia
(74) *Attorney, Agent, or Firm* — Edwards Wildman Palmer LLP; David G. Conlin; Stephen D. LeBarron

(57) ABSTRACT

When a user approaches an MFP, a print process based on print data corresponding to the user is executed immediately. MFP executes a program including the steps of: searching for an IC tag held by a user in a designated range (S3000); transmitting, when an IC tag is searched out, user information received from the IC tag to a server (S3040); when a user alarm request signal, which is transmitted if uploaded data corresponding to the user information satisfies user alarm conditions, is received from the server, executing a user alarm process (S3060); receiving RIP data obtained by converting the uploaded data corresponding to the user information from the server (S3070); displaying print data (S3090); and, when the print data is designated and printing is requested (YES at S3100), executing print process using the RIP data (S3110).

6 Claims, 16 Drawing Sheets

FIG. 5

| ALARM CONDITIONS | USER INFORMATION | PRINT DATA INFORMATION |
|---|---|---|
| (A) DEGREE OF IMPORTANCE SET ON PRINT DATA | SETTABLE | RANK ONLY SETTABLE |
| (B) DATE & TIME OF DATA FORMATION | SETTABLE | NON-SETTABLE (AUTO) |
| (C) DATE & TIME OF DATA UPLOAD | SETTABLE | NON-SETTABLE (AUTO) |
| (D) OUTPUT (PRINT) PERIOD | SETTABLE | SETTABLE |
| (E) OUTPUT (PRINT) DEVICE | SETTABLE | SETTABLE |
| (F) OUTPUT (PRINT) TARGET USER | SETTABLE | SETTABLE |

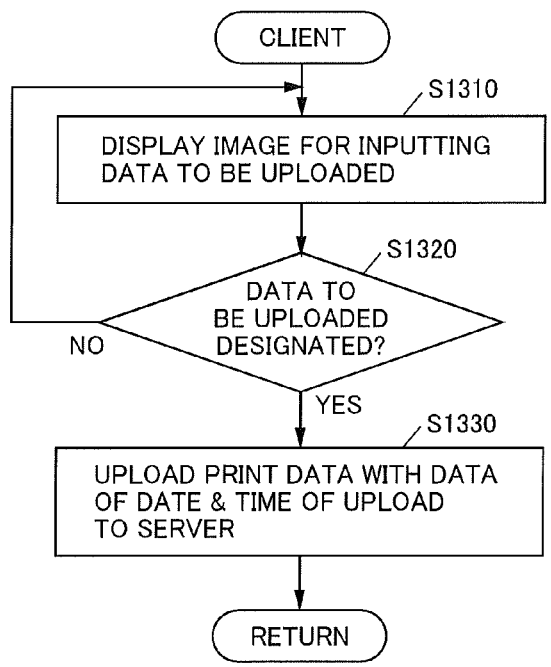

| USER | ALARM CONDITIONS |
|---|---|
| USER (1) | (A) RANK S OR HIGHER |
| | (B) 2009/08/01 OR LATER |
| | (C) 2009/08/01 OR LATER |
| | (D) FROM 2009/08/10 TO 2009/08/14 |
| | (E) CONFERENCE ROOM MFP, DEPARTMENT MFP |
| | (F) INCLUDED (ONLY WHEN USER HIMSELF/HERSELF IS INCLUDED) |
| USER (2) | (A) RANK A OR HIGHER |
| | (B) 2009/07/15 OR LATER |
| | (C) 2009/08/01 OR LATER |
| | (D) FROM 2009/08/10 TO 2009/08/14 |
| | (E) DEPARTMENT MFP |
| | (F) INCLUDED (ONLY WHEN USER HIMSELF/HERSELF IS INCLUDED) |
| ... | ... |
| | ... |
| | ... |
| | ... |
| | ... |
| | ... |

FIG. 7

| NAME | PRINT PERMISSION | (A) IMPORTANCE DEGREE INFORMATION (S>A>B···) | DATE & TIME INFORMATION | | ALARM CONDITIONS ITEMS | ALARM DESIGNATION FLAG |
|---|---|---|---|---|---|---|
| | | | (B) DATE & TIME OF DATA FORMATION | (C) DATE & TIME OF UPLOAD | | |
| | | | | | (D) OUTPUT PERIOD | ON/OFF |
| | | | | | (E) OUTPUT DEVICE | |
| | | | | | (F) TARGET USER | |
| DATA NAME | | | | | | |

FIG. 8

| NAME | PRINT PERMISSION | (A) IMPORTANCE DEGREE INFORMATION (S>A>B...) | DATE & TIME INFORMATION | | ALARM CONDITIONS ITEMS | ALARM DESIGNATION FLAG |
|---|---|---|---|---|---|---|
| | | | (B) DATE & TIME OF DATA FORMATION | (C) DATE & TIME OF UPLOAD | | |
| CONFERENCE MATERIAL | SUB-ASSISTANT MANAGER AND SUPERIOR | S | 2009/8/8 | 2009/8/10 | (D)2009/8/12 13:00~15:00<br>(E)CONFERENCE ROOM MFP<br>(F)GENERAL MANAGER MR. A, MANAGER MS. B, ASSISTANT MANAGER MR C, SUB-ASSISTANT MANAGER MR. D, SUB-ASSISTANT MANAGER MS. E | ON |
| SUMMER PARTY PHOTO | ○○DEPARTMENT STAFF | — | 2009/8/5 | 2009/8/8 | (D)<br>(E)<br>(F) | OFF |
| CONFERENCE MINUTES | SUB-ASSISTANT MANAGER AND SUPERIOR | B | 2009/8/13 | 2009/8/14 | (D)<br>(E)<br>(F)GENERAL MANAGER MR. A, MANAGER MS. B, ASSISTANT MANAGER MR C, SUB-ASSISTANT MANAGER MR. D, SUB-ASSISTANT MANAGER MS. E | ON |
| ... | ... | ... | ... | ... | (D)...<br>(E)...<br>(F)... | ... |

SERVER COMPUTER AND IMAGE FORMING APPARATUS FOR FORMING AN IMAGE BASED ON IMAGE DATA STORED ON SERVER COMPUTER

CROSS-REFERENCE TO RELATED APPLICATION

This nonprovisional application claims priority under 35 U.S.C. §119(a) on Patent Application No. 2009-243057 filed in Japan on Oct. 22, 2009, the entire contents of which are hereby incorporated by reference.

BACKGROUND OF THE INVENTION

1. Field of the Invention

The present invention relates to a network image forming system including a server computer (hereinafter simply referred to as a "server"), an image forming apparatus and a client computer (hereinafter simply referred to as a "client"), in which the image forming apparatus forms an image based on image data stored in the server.

2. Description of the Background Art

In a company or an office (hereinafter referred to as a "company"), generally, a client computer (an information processing apparatus, a personal computer (PC) or the like) is allocated to an individual, and each client is connected to LAN (Local Area Network). Generally, the LAN is connected to the Internet. Therefore, individual in the company can use resources on the Internet using a browser or e-mail.

Image forming apparatuses having printing function (printer function) are often connected to the LAN. Such an image forming apparatus is shared in the company through the LAN. A user using a PC connected to the LAN in the company may transmit electronic data (print data) such as a word-processor document or spreadsheet document (hereinafter referred to as "word-processor document") through the LAN to the image forming apparatus, to have the document printed.

One of such image forming apparatuses is an MFP (Multifunction Peripheral). MFP has a plurality of operational modes, including copy mode, image communication mode, network-supported printer mode and scanner mode. Recently, most of the image forming apparatuses are MFPs. In the following, description will be given using an MFP as a representative image forming apparatus.

Conventionally, a network image forming system referred to as "pull-print" system for improving user convenience in a network environment including an MFP such as described above, a client (information terminal) and a server (information processing apparatus) has been known. In the pull-print system, a print job or print jobs are registered in advance by a client with the server. A print job registered with the server is selected through an operation panel of the MFP and the print job is downloaded from the server to the MFP. Based on the downloaded print job, MFP forms an image on a sheet of recording paper.

In the pull-print system as such, one MFP is shared by a number of users. Therefore, it is not uncommon that, when a user comes to an MFP for pull-printing, another person is using the operation panel. In such a situation, the user must wait until the previous user ends his/her operation. The print time for pull-printing involves the time of downloading PDL (Page Description Language) data from the server to the MFP, the time for converting the PDL data to developed data (RIP (Raster Image Processing) data), and the actual printing time. Here, the RIP data refers to data that is about to be printed, not requiring any further conversion for printing. The PDL data is formed by a printer driver of a client computer. The process for developing the PDL data to the RIP data may be executed by the server or by the MFP.

When another person is using the operation panel, the user generally waits to use the operation panel. When it becomes available, the user logs-in to the MFP, whereby the downloading of PDL data, development of PDL data to RIP data, and printing of the RIP data are executed. In such a situation, downloading of the PDL data starts only after the user logs-in to the MFP. Therefore, the user must wait for a long time in front of the MFP until the printing is done.

In view of such a problem, Japanese Patent Laying-Open No. 2007-105937 (hereinafter referred to as "'937 Reference") discloses an MFP that allows, while a user is logged-in to the MFP, reservation of a process (job) using the MFP by another user. Even while one user is logged-in to the MFP, the MFP can execute pre-processing of the reserved job. Job reservation is done by the user having an IC card recording user information read by an IC card reader of the MFP. This process is different from the process for log-in. The pre-processing includes processes of pull-printing such as downloading of print data and development of PDL data to RIP data, other than image formation.

With this MFP, even when one user is logged-in to the MFP, another user having an IC card can make a reservation of a job using the MFP. Before log-in of the said another user, pre-processing of the reserved job is done by the MFP. Therefore, the time necessary for the user who made the reservation to obtain the print output (print wait time) can be reduced.

The MFP, however, still has a room for improvement. Specifically, it is necessary to have the IC card reader of the MFP to read the IC card information for reservation.

Japanese Patent Laying-Open No. 2006-47765 (hereinafter referred to as "'765 Reference") discloses a possible solution to this problem. '765 Reference discloses an MFP having an IC tag reader-writer, detecting whether or not a user is approaching. If there is an IC tag in a range of radio wave generated by the IC tag reader-writer, communication between the IC tag reader-writer and the IC tag becomes possible. As a result, the MFP can detect that the user having the IC tag is approaching the MFP.

By combining the MFP disclosed in '937 Reference with the MFP configuration (IC tag reader-writer) disclosed in '765 Reference, a configuration would be obtained in which an approaching user is automatically recognized by the MFP and reservation is made automatically. Even in such a configuration, printing cannot be started until the user logs-in. Therefore, the time until the user obtains the print output cannot be reduced.

The MFP disclosed in '937 Reference is based on the premise that a user who wishes to have print data stored in the server printed by the MFP comes to the intended MFP. A user who is unaware of any data to be printed or a user who forgets that there is some data to be printed may not go to the MFP. Even if such a user should come close to the MFP, he/she may not recognize the necessity to log-in to the MFP to print the data that should be printed. Therefore, even if data to be output is stored in the server, the data may not be output and left as it is.

SUMMARY OF THE INVENTION

In order to solve the above described problem, a system of forming an image by a network-connected image forming apparatus is desired, by which even a user not aware of print data that should be output from the image forming apparatus by logging-in can obtain the print data in a short period of time when the user approaches the image forming apparatus. Further, there is a demand for a server and an image forming apparatus used in such an image forming system.

According to a first aspect, the present invention provides a server computer used in a network image forming system. The system includes the server computer accumulating image forming jobs, a client computer forming an image forming job and transmitting the job to the server computer, and an image forming apparatus transmitting user information received through noncontact communication within a predetermined range to the server computer and forming an image using data received from the server computer. The server computer includes: an accumulating device accumulating image forming jobs received from the client computer; a first receiving device receiving user information from the image forming apparatus; a searching device searching for an image forming job corresponding to the user information received from the image forming apparatus from among the image forming jobs accumulated in the accumulating device; and a transmitting device connected to the searching device, for transmitting the image forming job necessary for image formation, searched out by the searching device, to the image forming apparatus that transmitted the user information.

The server may further include an image data developing device developing data allowing image formation by the image forming apparatus that transmitted the user information, based on the searched out image forming job.

According to a second aspect, the present invention provides a program product including a computer-readable recording medium. The recording medium stores a computer program causing, when executed by a computer, the computer to operate as the above-described server computer.

According to a third aspect, the present invention provides a data processing method by a server computer used in a network image forming system. The system includes the server computer accumulating image forming jobs, a client computer forming an image forming job and transmitting the job to the server computer, and an image forming apparatus transmitting user information received through noncontact communication within a predetermined range to the server computer and forming an image using data received from the server computer. The method includes the steps of: accumulating image forming jobs received from the client computer; receiving user information from the image forming apparatus; searching for an image forming job corresponding to the user information received from the image forming apparatus from among the accumulated image forming jobs; and transmitting the image forming job necessary for image formation, searched out at the searching step, to the image forming apparatus that transmitted the user information.

According to a fourth aspect, the present invention provides an image forming apparatus used in a network image forming system. The system includes the image forming apparatus, a server computer accumulating image forming jobs and transmitting data of accumulated image forming job corresponding to user information received from the image forming apparatus to the image forming apparatus that transmitted the user information, and a client computer forming an image forming job and transmitting the job to the server computer. The image forming apparatus includes: a communication device receiving user information by noncontact communication in a predetermined range; a transmitting device transmitting the user information received by the communication device to the server computer; a receiving device receiving data necessary for image formation by itself from the server computer; and an image forming unit forming an image using the data received by the receiving device from the server computer.

According to a fifth aspect, the present invention provides a program product including a computer-readable recording medium. The recording medium stores a computer program causing, when executed by a computer, the computer to operate as the above-described image forming apparatus.

In the network image forming system as described above, an image forming job formed by a client (the image forming job refers to data necessary for forming an image by the image forming apparatus, including data of various forms) is transmitted to and stored in the server. If a user holding a noncontact communication tag comes within a predetermined range from the image forming apparatus, the image forming apparatus receives user information through noncontact communication, and transmits the information to the server. The server searches for an image forming job corresponding to the user information received from the image forming apparatus, from among the stored image forming jobs. Based on the searched out image forming job, the server forms data necessary for image formation (data necessary for image formation by the image forming apparatus as the transmission destination), and transmits the data to the image forming apparatus as the source of user information. Receiving the data necessary for image formation from the server, the image forming apparatus forms image using the received data (for example, prints and outputs an image on a sheet of recording paper (print)).

When the user whose user information corresponds to the image forming job stored in the server simply comes closer to the image forming apparatus, the server searches for the image forming job corresponding to the user, forms data necessary for image formation, and transmits the data to the image forming apparatus. It is unnecessary for the user to log-in to the image forming apparatus, and when the user simply approaches the image forming apparatus, the image forming job can be output from the image forming apparatus. When the user simply approaches the image forming apparatus, data necessary for image formation is transmitted from the server to the image forming apparatus. Therefore, the time necessary for image formation (wait time) can significantly be reduced. For instance, it is possible to have the output completed by the time the user reaches the image forming apparatus. As a result, even if the user has no idea of getting image output from the image forming apparatus, an image intended for the user can be formed quickly on a sheet of paper and output, when the user simply comes close to the image forming apparatus.

As described above, in the system of forming an image by an image forming apparatus connected through a network, even if the user has no idea of getting image output from the image forming apparatus, an image intended for the user can be formed quickly by the image forming apparatus to which user approaches.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows conditions for giving an alarm to the user (hereinafter referred to as user alarm conditions) in the network print system in accordance with an embodiment of the present invention.

FIG. 6 shows a user alarm conditions management table managed in the server shown in FIG. 1.

FIG. 7 shows a data format of attribute information managed with print data stored in the server shown in FIG. 1.

FIG. 8 shows specific examples of the attribute information of FIG. 7.

FIG. 10 is a flowchart representing a control structure of an uploading program executed by the client.

DESCRIPTION OF THE PREFERRED EMBODIMENTS

Figure 1:
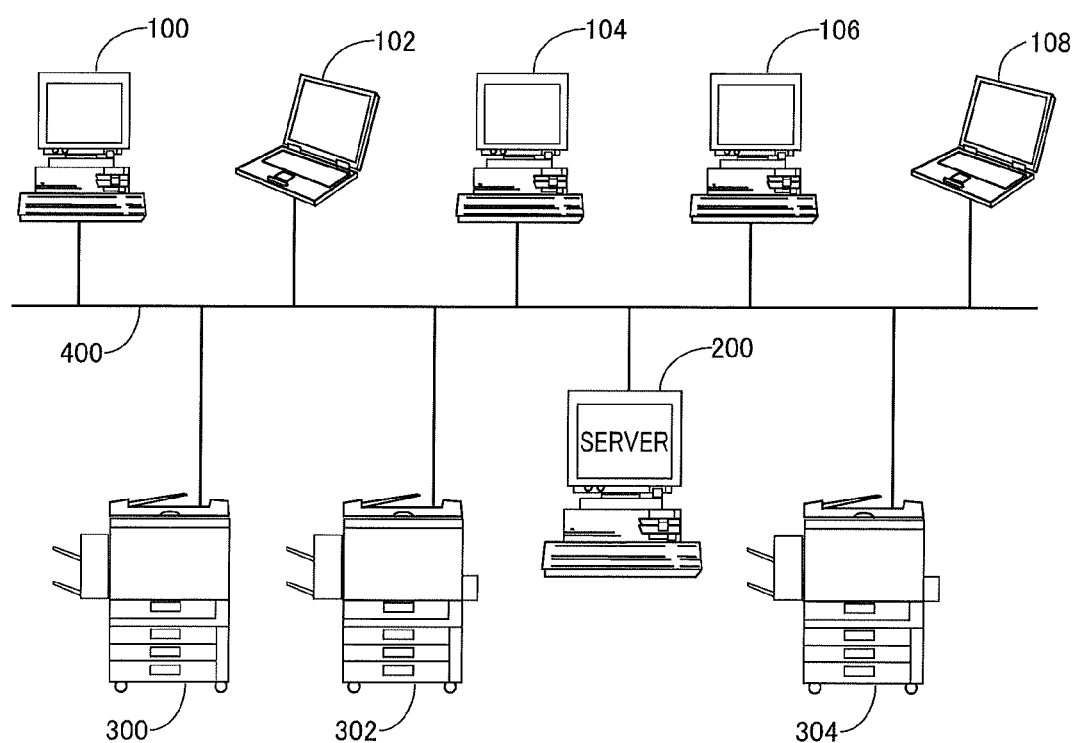
FIG. 1 shows an overall configuration of the network print system in accordance with an embodiment of the present invention.

In the following description, the same components are denoted by the same reference characters. Their names and functions are also the same. Therefore, detailed description thereof will not be repeated. In the following, the image forming apparatus is an MFP. The image forming apparatus, however, is not limited to an MFP. Any image forming apparatus including at least a network-supported printing function may be used. The network print system in accordance with the present embodiment is an example of a network image forming system, and it includes a client, a server accumulating print data transmitted from the client, and an MFP forming an image on a sheet of recording paper based on the print data received from the server. Here, transmission of print data from the client to the server will be referred to as "data uploading." Reception of data by the MFP from the server will be referred to as "print data downloading." In the present embodiment, the downloaded data is assumed to be RIP data developed from the PDL data. Since the MFP downloads the RIP data from the server, data conversion in the MFP becomes unnecessary, and therefore, the print time in the MFP can advantageously be made shorter. It is noted, however, that the downloaded data may have other format (for example, PDL data). Data necessary for image formation in the MFP may be generally referred to as image forming job.

[Overall System Configuration]

In the following, a user who forms print data such as word processor document on the client will be simply referred to as a "creator." A user who has the print data prepared by the creator printed by the MFP will be simply referred to as a "user."

Referring to FIG. 1, the network print system in accordance with the present embodiment includes: a server 200 accumulating print data; clients 100, 102, 104, 106 and 108 uploading print data such as the word processor document prepared by the creator to server 200; and MFPs 300, 302 and 304 downloading RIP data from server 200 and printing images on sheets of paper, respectively. In response to a request from MFPs 300 to 304, the server transmits RIP data from among the accumulated print data, to the MFP that transmitted the request. Clients 100, 102, 104, 106 and 108, server 200, and MFPs 300, 302 and 304 are connected to be communicable with each other by a network line 400 in compliance with, for example, IEEE802.3. In the following description, clients 100, 102, 104, 106 and 108 will be represented by client 100, and MFPs 300, 302 and 304 will be represented by MFP 300, respectively.

Server 200 stores a list of users who are permitted to use the network print system.

In the network print system, basically, the word processor documents and the like are converted by a printer driver installed in the client to PDL data. The converted PDL data is transmitted to and stored in the server.

The number of client 100, the number of server 200 and the number of MFP 300 are not limited to those shown in FIG. 1. Further, in the following and in the drawings, client 100 may be simply referred to as a client or a PC, and server 200 may be simply referred to as a server.

[Hardware Configuration]

<Client 100>

Figure 2A:
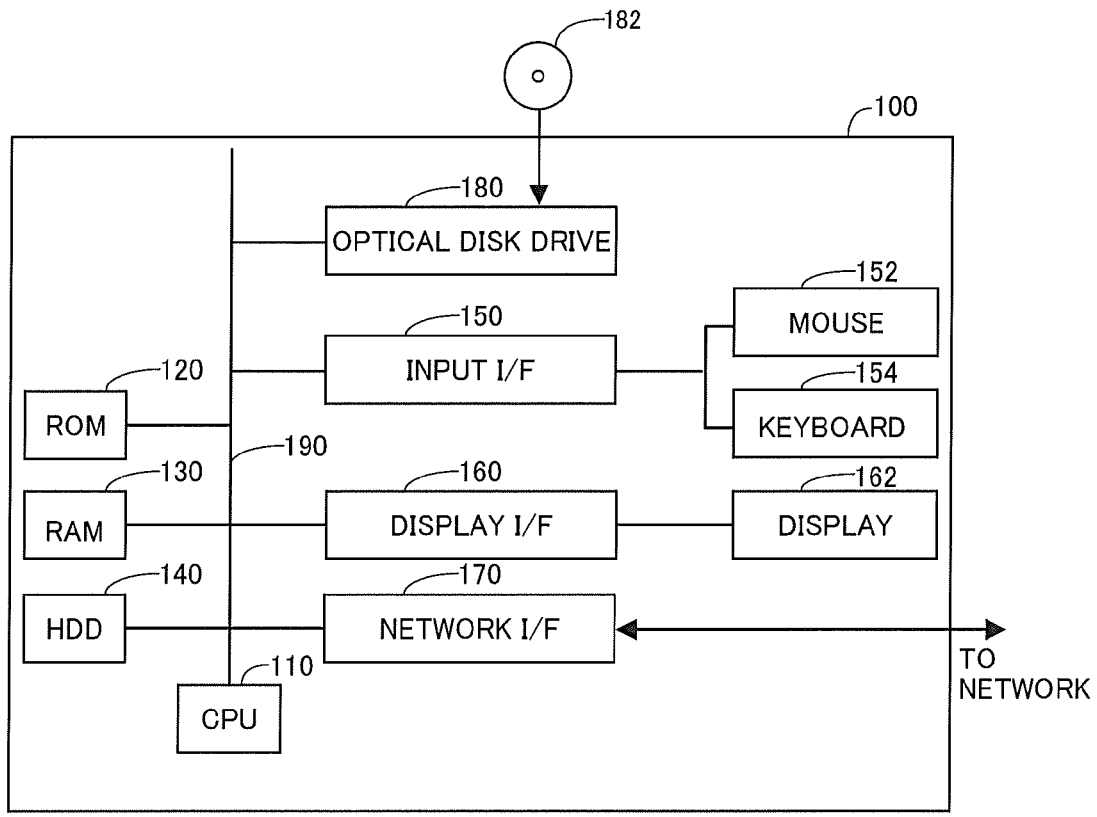
FIG. 2A is a control block diagram showing hardware configuration of a client PC shown in FIG. 1.
Figure 2B:
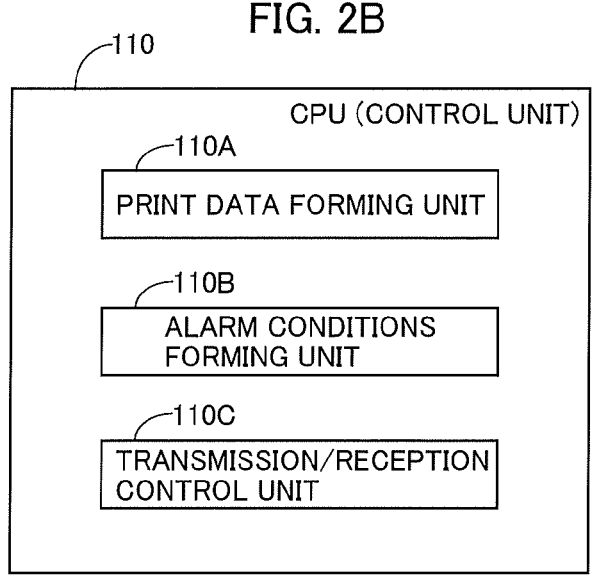
FIG. 2B schematically shows a list of functions realized by a program executed by a CPU (Central Processing Unit) of the PC shown in FIG. 1.

Referring to FIGS. 2A and 2B, client 100 includes: a bus 190; a CPU 110 connected to bus 190; an ROM (Read Only Memory) 120 connected to bus 190; an RAM (Random Access Memory) 130 connected to bus 190; a hard disk (HDD) 140 connected to bus 190; an optical disk drive 180 connected to bus 190, to which an optical disk 182 can be mounted, capable of writing information to and reading information from optical disk 182; an input interface (hereinafter referred to as "input I/F") 150 connected to bus 190, providing an interface for connection to a mouse 152 and a keyboard 154; a display interface (hereinafter referred to as "display I/F") 160, connected to bus 190, providing an interface for connection to a display 162; and a network interface (hereinafter referred to as "network I/F") 170 providing wired or wireless (in the present embodiment, wired) connection to network line 400. Client computer 100 may include a magnetic disk drive, to which a magnetic disk can be mounted, capable of writing information to and reading information from the magnetic disk, in place of/in addition to optical disk drive 180. Network I/F 170 may be an interface for wireless connection to network line 400, and client 100 may be a notebook type device.

Bus 190, ROM 120, RAM 130, hard disk 140, optical disk drive 180, input I/F 150, display I/F 160 and network I/F 170 cooperate with each other under the control of CPU 110, and realize processes of various applications in client 100. These applications include, for example, the processes for producing word processor documents, spreadsheet documents, and uploading process for transmitting the print data formed by such processes to server 200.

A computer program causing client 100 to execute the processes mentioned above is stored in optical disk 182 inserted to optical disk drive 180, and transferred to hard disk 140. Alternatively, the program may be transmitted through network line 400 to client 100 and stored in hard disk 140. The program is loaded to RAM 130 at the time of execution. The program may directly be loaded to RAM 130 from optical disk 182 or through network line 400.

Such a program includes a plurality of instructions to cause client 100 to execute prescribed processes. Some of the basic functions necessary to realize such operations are provided by the operating system (OS) operating on client 100 or third party programs, or software modules of various program tool kits (for example, a printer driver) installed in client 100. Therefore, the program may not necessarily include all functions required for realizing the system in accordance with the present embodiment. The program may simply include an instruction to execute the prescribed processes of client 100 as described above by calling appropriate functions or "program tools" in a controlled manner to attain desired results. General operations of a computer acting as client 100 are well known and, therefore, description thereof will not be given here.

As shown in FIG. 2B, a control unit formed by CPU 110 of client 100 includes: print data forming unit 110A realized by the word processor document forming program or the spreadsheet document forming program (hereinafter simply referred to as "word processor program"); an alarm conditions forming unit 110B forming, when there is any print data related to a user approaching MFP 300 (hereinafter such an approaching user will be referred to as "subject user"), conditions for giving an alarm to the subject user, for notifying presence of such data (the conditions will be referred to as "alarm conditions," of which details will be described later); and a transmission/reception control unit 110C for uploading the print data formed by print data forming unit 110A and the alarm conditions formed by alarm conditions forming unit 110B to server 200.

The print data formed by print data forming unit 110A and alarm conditions formed by alarm conditions forming unit 110B are once stored in hard disk 140 with the date and time of formation. Thereafter, when a user requests uploading to server 200, the data and conditions are read from hard disk 140 and uploaded to server 200 by transmission/reception control unit 110C, accompanied with date and time of uploading.

The control block configuration shown in FIG. 2B may be realized by hardware. In the present embodiment, however, it is realized by software as will be described later.

<Server 200>

Figure 3A:
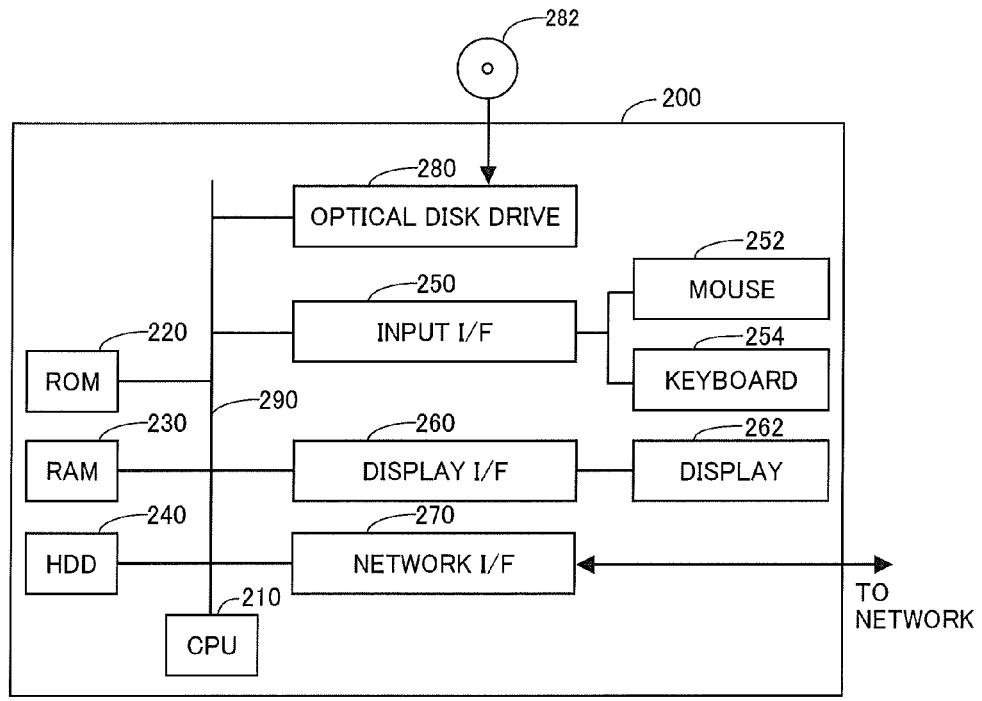
FIG. 3A is a control block diagram showing hardware configuration of a server shown in FIG. 1.
Figure 3B:
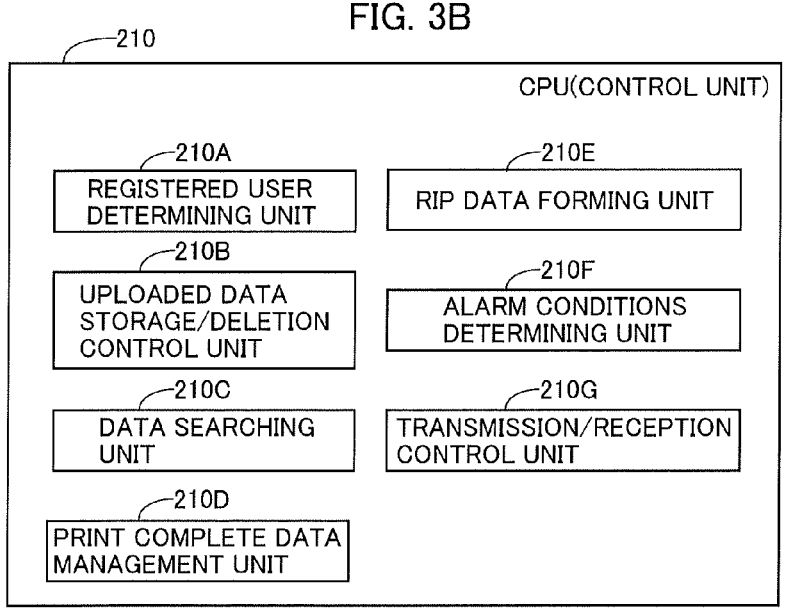
FIG. 3B schematically shows a list of functions realized by a program executed by a CPU of the server shown in FIG. 1.

FIG. 3A shows an overall configuration of server 200 forming the network print system in accordance with the present embodiment, and FIG. 3B shows a control block diagram of CPU 210 of FIG. 3A.

As can be seen from FIGS. 3A and 3B, server 200 forming the network print system in accordance with the present embodiment is a computer having a similar configuration as client 100 described above. Parts of higher reliability are used for components of server 200 than those for components of a so called personal computer.

Server 200 includes: a bus 290; a CPU 210 connected to bus 290; an ROM 220 connected to bus 290; an RAM 230 connected to bus 290; a hard disk (HDD) 240 connected to bus 290; an optical disk drive 280 connected to bus 290, to which an optical disk 282 can be mounted, capable of writing information to and reading information from optical disk 282; an input I/F 250 connected to bus 290, providing an interface for connection to a mouse 252 and a keyboard 254; a display I/F 260, connected to bus 290, providing an interface for connection to a display 262; and a network I/F 270 providing wired or wireless (in the present embodiment, wired) connection to network line 400. As in the case of client 100, server 200 may include a magnetic disk drive, in place of/in addition to optical disk drive 280.

Bus 290, ROM 220, RAM 230, hard disk 240, optical disk drive 280, input I/F 250, display I/F 260 and network I/F 270 cooperate with each other under the control of CPU 210, and server 200 as the server in accordance with the present embodiment realizes processes of various applications. By way of example, the applications include: a process for accumulating print data uploaded from client 100; a process for searching for print data corresponding to a user, if the user specified by the user information transmitted from MFP 300 is a registered user; a process for converting the print data fit for MFP 300 to RIP data; and a process for downloading the RIP data to MFP 300.

A computer program causing server 200 to execute the operations of the server in the network print system in accordance with the present embodiment is stored in optical disk 282 inserted to optical disk drive 280, and transferred to hard disk 240. Alternatively, the program may be transmitted through network line 400 to server 200 and stored in hard disk 240. The program is loaded to RAM 230 at the time of execution. The program may directly be loaded to RAM 230 from optical disk 282 or through network line 400.

Such a program includes a plurality of instructions to cause server 200 to execute the operations of the server computer in the network print system in accordance with the present embodiment. Some of the basic functions necessary to realize such operations are provided by the operating system (OS) operating on server 200 or third party programs, or modules of various tool kits installed in server 200. Therefore, the program may not necessarily include all functions required for realizing the system in accordance with the present embodiment. The program may simply include an instruction to execute the prescribed processes of server 200 as described above by calling appropriate functions or "tools" in a controlled manner to attain desired results. General operations of a computer acting as server 200 are well known and, therefore, description thereof will not be given here.

As shown in FIG. 3B, a control unit formed by CPU 210 of server 200 includes: a user determining unit 210A determining, based on the user information received from MFP 300, whether or not the user corresponding to the user information is permitted to use the network print system; an uploaded data storage/deletion control unit 210B storing or deleting the print data uploaded from client 100 in or from hard disk 240; a data searching unit 210C searching for print data corresponding to a user approaching MFP 300 from the print data uploaded from client 100 and stored in hard disk 240; a print complete data management unit 210D managing whether or not printing by MFP 300 is completed, based on a print complete signal transmitted from MFP 300; an RIP data forming unit 210E converting the print data to RIP data; an alarm conditions determining unit 210F determining whether or not alarm conditions are satisfied, based on pre-set alarm conditions; and a transmission/reception control unit 210G receiving print data from client 100, receiving user information from MFP 300 and downloading RIP data to MFP 300.

The print data uploaded from client 100 by transmission/reception control unit 210G is stored in hard disk 240 by uploaded data storage/deletion control unit 210B. At this time, the alarm conditions set, for example, by a printer user, are also stored in hard disk 240. Based on the user information received from MFP 300 at transmission/reception control unit 210G, user determining unit 210A determines whether or not the user is a registered user (a user who is permitted to print using the network print system). If the user is a registered user, data searching unit 210C searches for print data corresponding to the user, from the print data stored in hard disk 240. The corresponding print data found as a result of search is converted by RIP data forming unit 210E to RIP data, and transmitted by transmission/reception control unit 210G to MFP 300 (viewed from MFP 300, downloaded). Further, whether or not the alarm conditions are satisfied by the corresponding print data found as a result of search is determined by alarm conditions determining unit 210F, and if the alarm conditions are satisfied, a user alarm request signal is transmitted from transmission/reception control unit 210G to MFP 300. When a print complete signal is received by transmission/reception control unit 210G from MFP 300, uploaded data storage/deletion control unit 210B determines whether or not printing for every user is completed, and the RIP data that is determined to have been printed by every user is deleted from hard disk 240.

The control block configuration shown in FIG. 3B may be realized by hardware. In the present embodiment, however, it is implemented by software as will be described later.

<MFP 300>

Figure 4A:
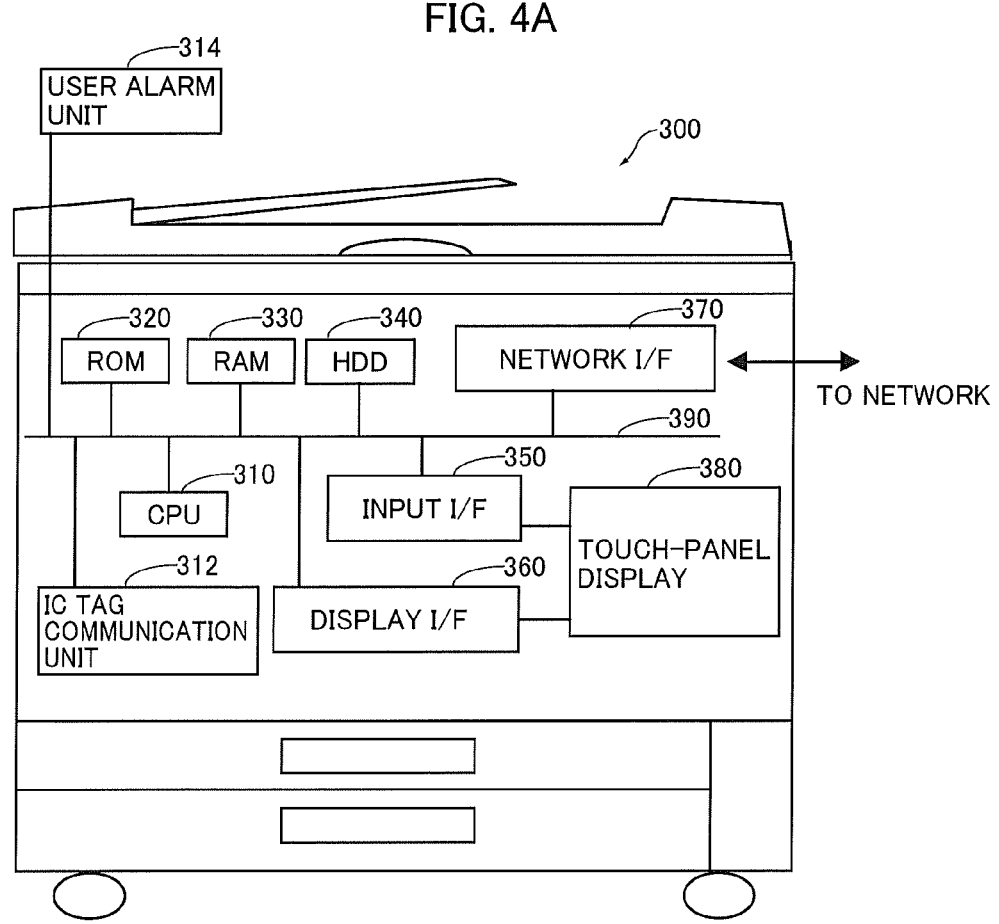
FIG. 4A is a control block diagram showing hardware configuration of an MFP shown in FIG. 1.
Figure 4B:
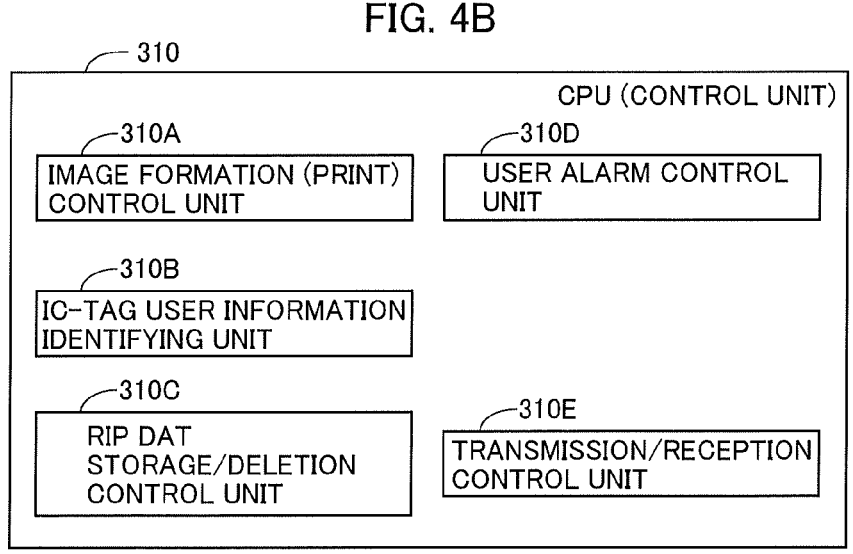
FIG. 4B schematically shows a list of functions realized by a program executed by a CPU of the MFP shown in FIG. 1.

Referring to FIGS. 4A and 4B, MFP 300 forming the network print system in accordance with the present embodiment includes: a bus 390; a CPU 310 connected to bus 390; an ROM 320 connected to bus 390; an RAM 330 connected to bus 390; a hard disk (HDD) 340 connected to bus 390; an input I/F 350 and a display I/F 360 connected to bus 390, providing an interface for connection to a touch-panel display 380; and a network I/F 370, connected to bus 390, providing wired or wireless (in the present embodiment, wired) connection to network line 400.

MFP 300 further includes an IC tag (RFID (Radio Frequency Identification) tag) communication unit 312. IC tag communication unit 312 has a function of reading/writing data (or data reading only) by wireless communication to/from an IC tag (held by a subject user) (not shown), and it includes, for example, a transmission antenna unit, a modulation circuit, a reception antenna unit, a demodulation circuit, a control unit and an I/F unit. Power is fed from MFP 300. The transmission antenna unit transmits radio wave to a noncontact IC (IC tag) held by the user. The modulation circuit modulates the radio wave transmitted from the transmission antenna unit. The reception antenna unit receives the radio wave transmitted from the IC tag. The demodulation circuit demodulates the signal received by the reception antenna unit. The I/F unit communicates with CPU 310. The IC tag data demodulated by the demodulating circuit (including the user information) is transmitted to CPU 310.

The IC tag held by the user includes a non-volatile memory, an antenna unit, a resonance capacitor, a power generating unit, a modulator/demodulator unit, and a control unit. The antenna unit is for transmitting/receiving radio wave, and it is combined with the resonance capacitor to form a resonance circuit. The power generating unit rectifies/smoothes power supply. The modulator/demodulator unit is for modulating and demodulating radio wave. When a radio wave signal for supplying power is transmitted from the outside to the IC tag, the radio signal is received by the resonance circuit, and supplied to power generating unit. Thus, the power generating unit supplies power necessary for operating the IC tag, to the non-volatile memory or to the modulator/demodulator unit. The non-volatile memory of IC tag stores user information that uniquely specifies each user, including a user using the network print system.

MFP 300 further includes a user alarm unit 314 connected to bus 90. User alarm unit 314 includes a small signal beacon provided at an upper portion of MFP 300 or a buzzer, for giving visual/audio alarm to the user approaching the MFP 300, notifying existence of data corresponding to the user. It is also possible to display a notice that data corresponding to the user approaching the MFP 300 exists, on touch-panel display 380.

Bus 390, ROM 320, RAM 330, hard disk 340, input I/F 350, display I/F 360 and network I/F 370 cooperate with each other under the control of CPU 310, and in MFP 300, realize the IC tag communication process, printing process, FAX transmitting/receiving process, scanning process, copying process, the process for transmitting user information to server 200, the process for receiving RIP data from server 200, and the process for giving alarm to the user in response to the user alarm request signal from server 200. Of these processes, the printing process, FAX transmitting/receiving process, scanning process and copying process are executed by various components forming MFP 300, not shown in FIG. 4, under the control of CPU 310.

The computer program causing MFP 300 to operate as the MFP in the network print system in accordance with the present embodiment is stored in hard disk 340. The program is loaded to RAM 330 at the time of execution. The program includes a plurality of instructions to cause MFP 300 to operate as the MFP of the network print system in accordance with the present embodiment.

As shown in FIG. 4B, the control unit formed by CPU 310 of MFP 300 includes: an image formation (print) control unit 310A forming an image on a sheet of recording paper based on RIP data downloaded from server 200; an IC-tag user information identifying unit 310B for identifying user information in the IC tag data determined by IC tag communication unit 312; an RIP data storage/deletion control unit 310C storing/deleting RIP data downloaded from server 200 to/from hard disk 340; a user alarm control unit 310D controlling the user alarm unit 314 described above; and a transmission/reception control unit 310E receiving the RIP data and the alarm request signal from server 200.

The user information identified by the IC-tag user information identifying unit 310B is transmitted by transmission/reception control unit 301E to server 200. The RIP data downloaded from server 200 by transmission/reception control unit 310E is stored in hard disk 340 by RIP data storage/deletion control unit 310C, and when printing is complete, it is deleted from hard disk 340. When transmission/reception control unit 310E receives the user alarm request signal from server 200, user alarm control unit 310D controls user alarm unit 314 such that an alarm is given to notify that data corresponding to the user approaching MFP 300 exists. If the user approaching MFP 300 requests printing, image formation (print) control unit 310A controls the image forming unit as will be described later, and forms an image on a sheet of recording paper using the RIP data stored in hard disk 340. When image formation ends, print complete information is transmitted from transmission/reception control unit 310E to server 200.

The control block configuration shown in FIG. 4B may be realized by hardware. In the present embodiment, however, it is implemented by software as will be described later.

In the following, the configuration of MFP 300 realizing image formation will be described. By way of example, MFP 300 includes a document reading unit, an image forming unit, a paper feed unit and a paper discharging device. In MFP 300, based on the RIP data downloaded from server 200, CPU 310 (more specifically, image formation (print) control unit 310A) controls the image forming unit so that an image is formed on a sheet of recording paper and the sheet of recording paper with the image formed thereon is discharged from paper discharge unit of MFP 300. MFP 300 has a so-called laser type printer function, in which a laser beam is utilized for exposure. It may have a different type printer function.

The image forming unit is for printing an image represented by the print data (RIP data) on a sheet of recording paper, and it includes, by way of example, a photoreceptor drum, a charger, a laser scanning unit, a developer, a transfer device, a cleaning device, a fixing device and a neutralizer. In the image forming unit, a feeding path, for example, is formed, and a sheet of recording paper fed from the paper feed unit is fed along the feeding path. The paper feed unit draws out sheets of recording paper stacked on a paper feed cassette or on a manual feed tray one by one, and feeds the sheet of paper to the feeding path of the image forming unit.

While the sheet of recording paper is fed along the feeding path of image forming unit, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum.

The transfer device transfers the toner image on the surface of photoreceptor drum to the sheet of recording paper passing between the transfer device and the photoreceptor drum. The fixing device includes a heating roller for heating the sheet of recording paper and the pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed paper) is discharged to the discharge tray. The paper discharging device may perform a process of sorting a plurality of printed sheets of paper to be output to different discharge trays, a process of punching each sheet of recording paper or a process of stapling the sheets of recording paper. Assume that a number of copies of the printing are to be prepared. In that case, sheets of recording paper are sorted and discharged to paper discharge trays such that each tray contains each set of printed sheets, and the set of printed sheets in each tray is stapled or punched, whereby copies of prints are prepared. Such processes are performed under the control of CPU 310 (more specifically, image formation (print) control unit 310A).

[Alarm Conditions]

Referring to FIG. 5, alarm conditions used in the network print system in accordance with the present embodiment will be described. Broadly speaking, pieces of information for determining whether or not the alarm conditions are satisfied include: alarm conditions management table (which will be described later with reference to FIG. 6) in user information set for each user by the user or an administrator; and attribute information (which will be described later with reference to FIGS. 7 and 8) set for each print data by the creator of the print data. By comparing the user information with the attribute information of the print data, determination is made as to whether or not the alarm conditions, which will be described below, are satisfied. In the present embodiment, when all alarm conditions are satisfied, the alarm request signal is transmitted from server 200 to MFP 300. Receiving the signal, MFP 300 causes alarm unit 314 to give an alarm to notify that data to be printed exists, to the user who approaches MFP 300.

In the present embodiment, in determining whether or not the alarm conditions are satisfied, the date and time when the MFP detected the approaching user and the identification information of MFP itself are used in addition to the alarm conditions management table of user information and the attribute information of print data.

Referring to FIG. 5, alarm conditions include the following conditions (A) to (F). In any case, it is necessary that a user is authorized to print the print data (given print permission) in advance, to have alarm conditions satisfied to give an alarm to the user in relation to the print data.

<Alarm Conditions>

(A) The degree of importance of print data included in the attribute information of the print data is of a specific rank of which printing is desired by the user.

(B) The date and time when the data is formed included in the attribute information of print data is within a specific period set in the user information.

(C) The date and time of data upload included in the attribute information of print data is within a specific period set in the user information.

(D) A specific period is set as an output period in the attribute information of print data, a specific period is set as an output period also in the user information, and the date and time when the user approaches MFP 300 is within both specific periods.

(E) A specific MFP is set as an output device in the attribute information of print data, a specific MFP is set also in the user information, both MFPs are the same, and the MFP to which the user approaches is designated to be the specific MFP.

(F) It is designated in the user information that the condition (F) should not be included; or it is designated in the user information that the condition (F) is to be included, the attribute information of print data is set to limit the output of print data to a specific user, and the user is set by the attribute information of the print data to be the user who is permitted to print the print data.

The alarm conditions listed above are mere examples, and the alarm conditions are not limited to these.

Referring to FIG. 6, the alarm conditions management table for managing the alarm conditions above will be described. The alarm conditions management table is stored in hard disk 240 of server 200. The user himself/herself or an administrator of the network print system inputs alarm conditions to the alarm conditions management table.

Characters (A) to (F) of FIG. 6 correspond to conditions (A) to (F) of FIG. 5. By way of example, consider a user (1) having print permission (set for each print data) for a certain print data stored in server 200. Here, for the user (1) and for the certain print data, set conditions are as follows.

As to condition (A), the degree of importance set in the print data is rank S or higher.

As to condition (B), the date and time when the print data is formed is Aug. 1, 2009 or later.

As to condition (C), the date and time of data upload is Aug. 1, 2009 or later.

As to condition (D), the user (1) approached MFP 300 in a period from Aug. 10, 2009 to Aug. 14, 2009.

As to condition (E), the user (1) approached an MFP installed in a conference room or an MFP installed in his/her own department;

As to condition (F), the user (1) is designated as the user for whom the print data is to be printed (hereinafter referred to as a "target user").

With these settings, an alarm is given to user (1). Specifically, when all these conditions are satisfied, an alarm is give to user (1) to recommend printing of the print data or to have the user recognize the presence of this print data.

In FIG. 6 and in other figures, for simplicity of description, only the date (date, month, and year) may be given. However, it is not intended to exclude the time information.

[Attribute Information of Print Data]

In the following, the data format of attribute information stored for each of the accumulated print data in server 200 will be described. The attribute data corresponds to the header of print data.

As shown in FIG. 7, the data format of attribute information includes: an area for storing the name of print data; an area for storing authorization (print permission) the user ought to have for printing the print data; an area for storing information of degree of importance indicated by characters S, A, B, . . . indicating the degree of importance of the print data; an area for storing the date and time when the print data was formed, and the data and time when the print data was uploaded to server 200; an area for storing alarm conditions set on the side of print data, corresponding to the conditions (D) to (F); and an area for storing an alarm designation flag, for controlling whether or not the alarm related to the print data is to be given to the user.

As regards condition (A), the creator can set the rank representing the degree of importance of the print data as the attribute information. The rank may be S, A, B, . . . from the highest degree of importance, and the importance is determined in advance by the system.

As regards condition (B), the date and time when the print data was formed is automatically added as the attribute information to the print data by client 100. It is impossible for the creator to arbitrarily set the date and time of formation.

As regards condition (C), the date and time when the print data was uploaded is automatically added as the attribute information to the print data by client 100 (or by server 200). It is impossible for the creator to arbitrarily set the date and time of upload.

As regards condition (D), the creator may designate a specific period. The period may include discontinuous periods.

As regards condition (E), the creator may designate an arbitrary MFP. A plurality of MFPs may be designated. For designating an MFP, identification information of the MFP is used. The identification information of the MFP refers to the information that allows unique identification of the MFP in the network system. It may be an IP address, a unique name of the MFP, or a device number of the MFP.

As regards condition (F), the creator may designate a specific user. A plurality of users may be designated.

Determination as to whether the alarm conditions are satisfied is made by comparing the attribute information of the print data with the information in the alarm conditions management table in the user information set for each user.

It is noted that pieces of information corresponding to conditions (D) to (F) may not be set. If attribute information is not set for these conditions, these conditions are regarded as satisfied, no matter what information is set as pieces of information corresponding to the conditions (D) to (F) on the user side.

That the alarm designation flag is off indicates that an alarm is not given to the user no matter whether the alarm conditions are satisfied or not. That the alarm designation flag is on indicates that an alarm is to be given to the user to notify the presence of print data to be printed, when the alarm conditions are satisfied.

Referring to FIG. 8, a specific example of attribute information of the print data will be described. As shown in FIG. 8, for the print data having the name "Conference Material," print permission is limited to "sub-assistant manager and his/her superior." The alarm designation flag is set ON. The degree of importance is set to "S". The date and time of formation is Aug. 8, 2009 and the date and time of upload is Aug. 10, 2009. As the piece of information in connection with user alarm condition (D), a period of 13:00 to 15:00 of Aug. 12, 2009 is set. As the piece of information in connection with user alarm condition (E), MFP 300 placed in the meeting room is set. As the piece of information in connection with user alarm condition (F), "General Manager: Mr. A", "Manager: Ms. B", "Assistant Manager: Mr. C", "Sub-assistant Manager: Mr. D" and "Sub-assistant Manager: Ms. E" are set.

When five persons, "General Manager: Mr. A", "Manager: Ms. B", "Assistant Manager: Mr. C", "Sub-assistant Manager: Mr. D" and "Sub-assistant Manager: Ms. E" set for user alarm condition (F) end printing of the print data (Conference Material) (when print complete information for these five persons is transmitted from MFP 300), the print data (and its attribute information) is deleted from hard disk 240 of server 200.

In the present embodiment, the creator of the print data is automatically granted the print permission.

[Software Configuration]

Referring to FIGS. 9A to 13B, control structures of programs executed by client 100, server 200 and MFP 300 for searching, from the print data formed by client 100 and uploaded to and stored in server 200, for the print data corresponding to a user who approaches MFP 300, converting the print data to RIP data and transmitting the data to MFP 300 (viewed from MFP 300, downloading the data), in the network print system in accordance with the present embodiment will be described.

Figure 9A:
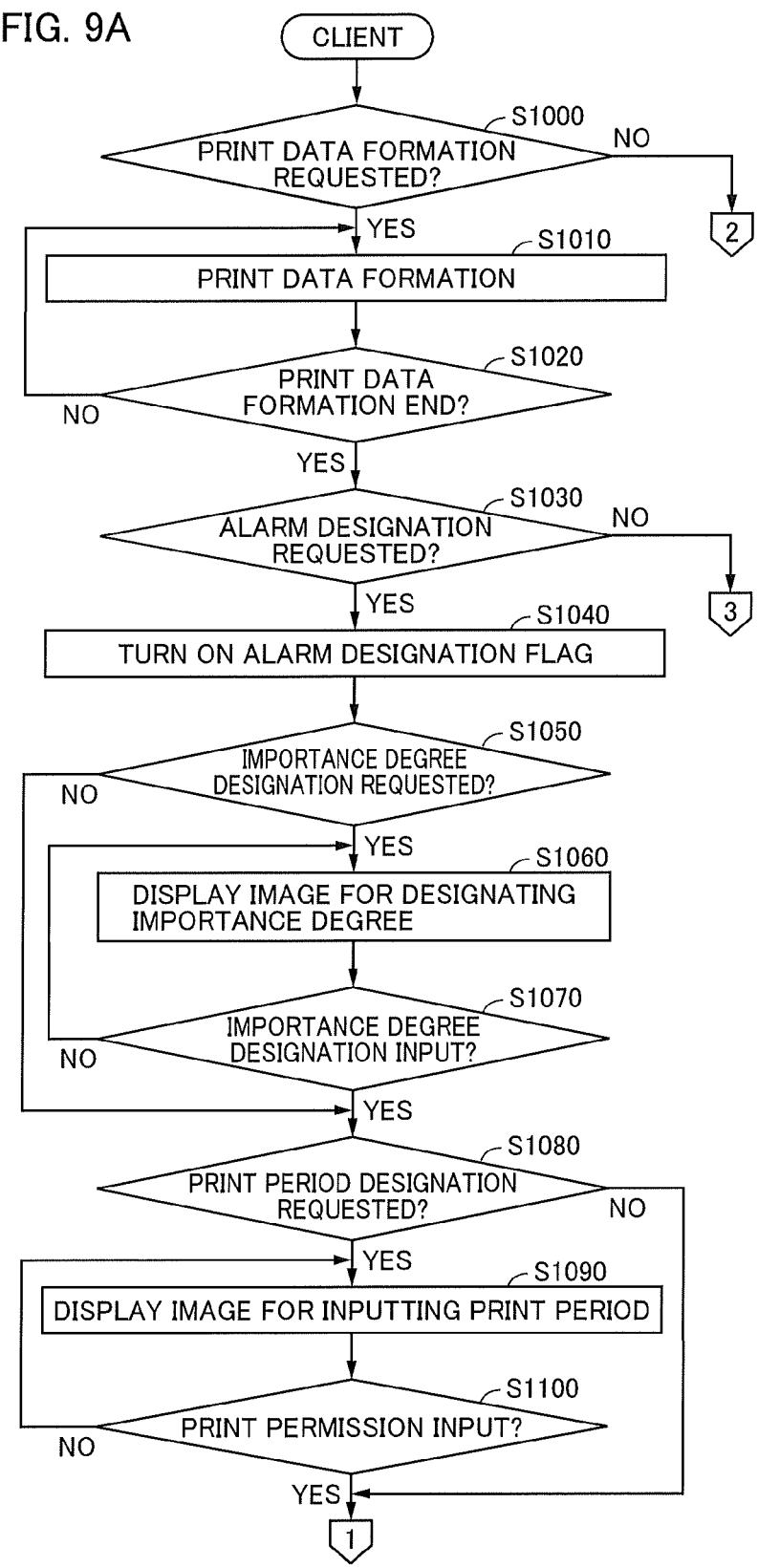
FIGS. 9A and 9B are flowcharts representing a control structure of a print data forming program executed by the client.
Figure 9B:
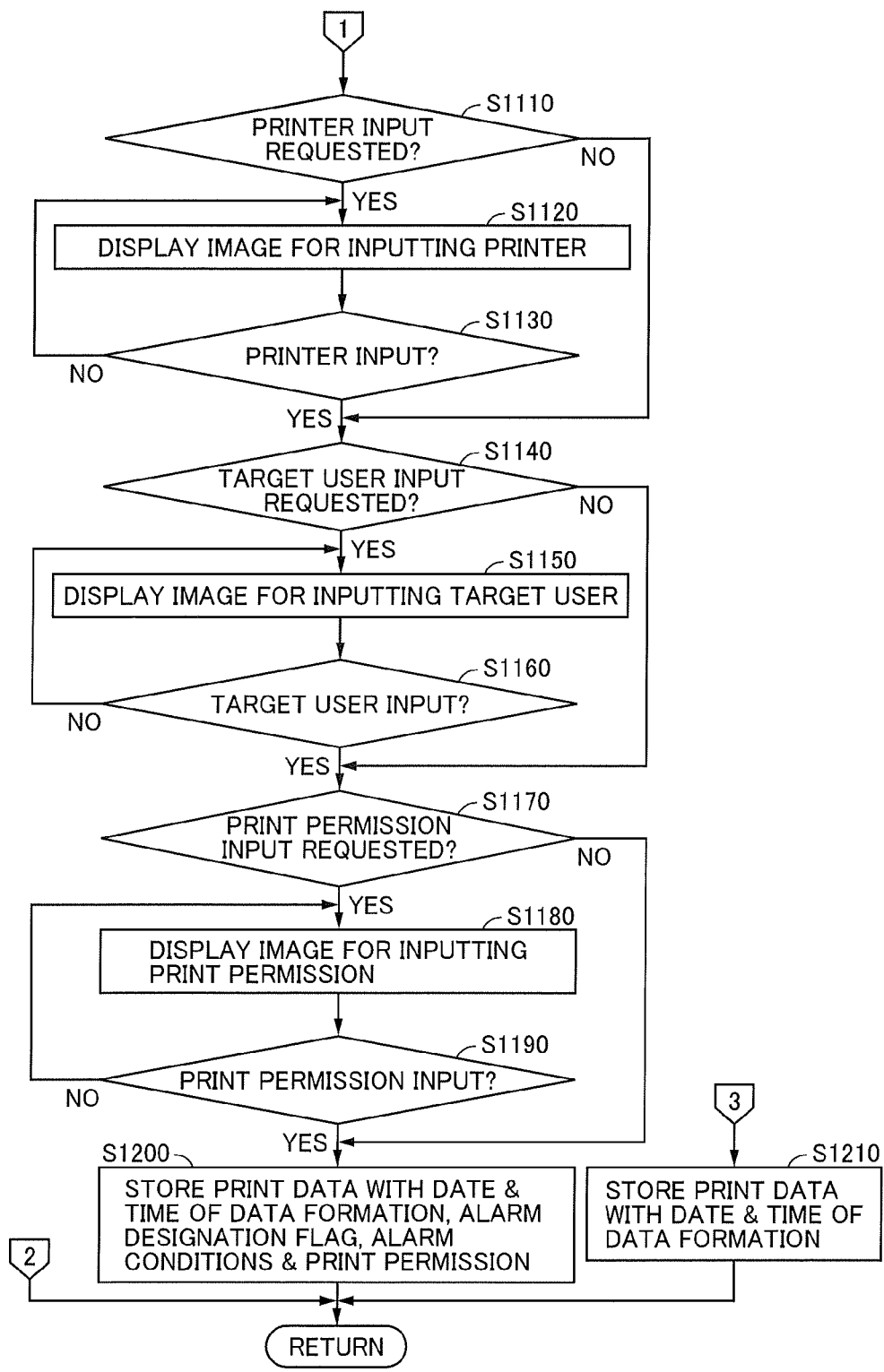

The program of which control structure is shown in FIGS. 9A and 9B is executed by a CPU 110 of client 100 (hereinafter simply referred to as "CPU 110"). At step (hereinafter "step" will be denoted by "S") 1000, CPU 110 determines whether or not a request for forming print data by the user (creator) is detected. By way of example, if the user requests activation of a word processor program, it is determined that the request for forming print data is detected. If the determination at S1000 is positive, the control proceeds to S1010. Otherwise, execution of the program ends.

At S1010, CPU 110 forms print data by the activated word processor program. The process step corresponds to the process executed by print data forming unit 110A of FIG. 2B. The print data forming process includes the process for forming PDL data executed by the printer driver. Specifically, the process steps after S1030, not including the very process of forming document, are executed by the printer driver or the like as an application separate from the word processor program application.

At S1020, CPU 110 determines whether or not formation of print data is completed. By way of example, if the user requests to save changes to the document and to exit the word processor program, it is determined that formation of print data is complete. If the determination at S1020 is positive, the control proceeds to S1030. Otherwise, the control returns to S1010, to continue formation of print data.

At S1030, CPU 110 ensures and initializes an area for the attribute information of the print data on a memory, and thereafter, determines whether or not a request for designating user alarm for the print data is detected. By way of example, a program such as the printer driver activated while the word processor program is being executed displays a choice dialog of "User Alarm Desired/Not Desired" on display 162. If the user selects the option "User Alarm Desired," it is determined that a request for designating user alarm for the print data is detected. Alarm conditions forming unit 110B is implemented by the execution of printer driver. If the determination at S1030 is positive, the control proceeds to S1040. Otherwise, the control proceeds to S1210.

At S1210, CPU 110 stores the formed print data in hard disk 140, and execution of the program ends.

If the process proceeds to S1040, CPU 110 sets ON the alarm designation flag (FIGS. 7, 8).

At S1050, CPU 110 determines whether or not a request designating degree of importance of the print data is detected. The degree of importance relates to condition (A). A choice dialog of "Degree of Importance to be Designated/Not to be Designated" is displayed on display 162. If the user selects the option "Degree of Importance to be Designated," it is determined that a request for designating the degree of importance of the print data is detected. If the determination at S1050 is positive, the control proceeds to S1060. Otherwise, the control proceeds to S1080.

At S1060, CPU 110 displays an image for designating the degree of importance of the print data on display 162. Here, with a message "Please enter degree of importance," options related to the degree of importance (5, A, B and the like) (typically, a pull-down menu or radio buttons) are displayed on display 162.

At S1070, CPU 110 determines whether or not an input of degree of importance of the print data is detected. If the user inputs the degree of importance, it is determined that the input of degree of importance of the print data is detected. If the determination at S1070 is positive, the control proceeds to S1080. Otherwise, the control returns to S1060, and waits until the input of degree of importance of the print data is determined to be detected. If the input of degree of importance of the print data is not determined to be detected even after a prescribed time period from when the image allowing designation of degree of importance of the print data is displayed on display 162, the process proceeds to S1080 assuming that the degree of importance is not designated.

At S1080, CPU 110 determines whether or not a request for designating a print period is detected. The print period relates to condition (D). A choice dialog "Print Period to be Designated/Not to be Designated" is displayed on display 162. If the user selects the option "Print Period to be Designated," it is determined that the request for designating print period is detected. If the determination at S1080 is positive, the control proceeds to S1090. Otherwise, the control proceeds to S1110.

At S1090, CPU 110 displays an image allowing designation of print period on display 162. A message "Please enter print period" is displayed on display 162.

At S1100, CPU 110 determines whether or not an input of print period is detected. If the user inputs a period for printing (a period in which printing is recommended), it is determined that the input of print period is detected. If the determination at S1100 is positive, the control proceeds to S1110. Otherwise, the control returns to S1090, and waits until it is determined that an input of print period is detected. Here again, if the input of print period is not determined to be detected even after a prescribed time period from when the image allowing designation of print period is displayed on display 162, the process may proceed to S1110, assuming that the print period is not designated. A plurality of discontinuous time periods may be input as the print period.

At S1110, CPU 110 determines whether or not an input requesting designation of a printer is input. The printer relates to condition (E). A choice dialogue "Printer to be Designated/Not to be Designated" is displayed on display 162. If the user selects the option "Printer to be Designated," it is determined that a request for designating a printer is detected. If the determination at S1110 is positive, the control proceeds to S1120. Otherwise, the control proceeds to S1140.

At S1120, CPU 110 displays an image allowing designation of a printer on display 162. A message "Please enter printer" is displayed on display 162.

At S1130, CPU 110 determines whether or not an input of printer is detected. If the user inputs an MFP 300 to be used for printing (printing by the printer is recommend), an input of printer is determined to be detected. If the determination at S1130 is positive, the control proceeds to S1140. Otherwise, the control returns to S1120, and waits until it is determined that an input of printer is detected. Here again, if the input of printer is not determined to be detected even after a prescribed time period from when the image allowing designation of printer is displayed on display 162, the process may proceed to S1140, assuming that the printer is not designated. Pieces of identification information of a plurality of MFPs may be input as the printer.

At S1140, CPU 110 determines whether or not a request for designating the target user of print data is detected. The target user relates to condition (F). A choice dialog "Target User to be Designated/Not to be Designated" is displayed on display 162. If the user selects the option "Target User to be Designated," it is determined that the request for designating a target user is detected. If the determination at S1140 is positive, the control proceeds to S1150. Otherwise, the control proceeds to S1170.

At S1150, CPU 110 displays an image allowing designation of a target user on display 162. A message "Please enter a target user" is displayed on display 162. Here, it is desired to display a pull-down menu or the like allowing selection from target user candidates.

At S1160, CPU 110 determines whether or not an input of target user is detected. If the user inputs an identifier or a name of the user (hereinafter generally referred to as "user identifier"), it is determined that the input of target user is detected. If the determination at S1160 is positive, the control proceeds to S1170. Otherwise, the control returns to S1150. Here again, if the input of target user is not determined to be detected even after a prescribed time period from when the image allowing designation of target user is displayed on display 162, the process may proceed to S1170, assuming that the target user is not designated. Here, a plurality of user identifiers may be input as the target user.

At S1170, CPU 110 determines whether or not a request for inputting print permission is detected. A choice dialog "Print Permission to be Input/Not to be Input" is displayed on display 162. If the user selects an option "Print Permission to be Input," it is determined that a request for inputting print permission is detected. If the determination is positive, the control proceeds to S1180. Otherwise, the control proceeds to S1200.

At S1180, CPU 110 displays an image allowing input of print permission for the designated uploaded data on display 162. A message "Please input print permission for the uploaded data" is displayed on display 162.

At S1190, determination is made as to whether or not the input for designating print permission is detected. If the user inputs print permission, the determination at S1190 is positive, and the control proceeds to S1200. Otherwise, the control returns to S1180. If the input of print permission is not determined to be detected even after a prescribed time period from when the image allowing designation of print permission is displayed on display 162, the process may proceed to the next step, assuming that the print permission is not designated.

The process of steps S1030 to S1190 corresponds to the process executed by alarm conditions forming unit 110B (implemented, for example, by the printer driver) shown in FIG. 2B.

At S1200, CPU 110 stores the formed print data with the attribute information including the date and time of data formation, the alarm designation flag, alarm conditions and print permission, in hard disk 140. Then, execution of the program ends.

Though the degree of importance can be designated only when user alarm is designated in the example above, the degree of importance may be designated without designating user alarm. In that case, the process of S1050 to S1070 is executed prior to S1030.

The program having the control structure shown in FIG. 10 is for uploading print data from client 100 to server 200. The program is also executed by CPU 110 of client 100. The program is activated when the user performs a prescribed process of requesting activation of the uploading program. The process may be executed following S1200 or S1210 of FIG. 9B.

At S1310, CPU 110 displays dialog allowing designation of data to be uploaded. A message "Please enter data to be uploaded" is displayed on display 162.

At S1320, CPU 110 determines whether or not an input designating print data to be uploaded to server 200 is detected. If the user (the creator or a person in charge of uploading) inputs a file name including file path of the print data to be uploaded, the determination of S1320 becomes positive, and the control proceeds to S1330. Otherwise, the control returns to S1310. If the input of print data is not determined to be detected even after a prescribed time period, the process may be terminated.

At S1330, CPU 110 uploads the designated print data, with the date and time of uploading added. The process corresponds to the process executed by transmission/reception control unit 110C of FIG. 2B. To server 200, together with the print data, attribute information of the print data is also uploaded. The attribute information includes the name of print data, permission to print the print data, information of degree of importance, date and time of data formation, date and time of uploading, pieces of information corresponding to conditions (D) to (F), and the alarm designation flag.

The process for inputting the print permission may be executed at the time of uploading shown in FIG. 10, rather than at the time of setting alarm conditions executed by the printer driver immediately after forming the print data shown in FIGS. 9A and 9B as described above.

Figure 11A:
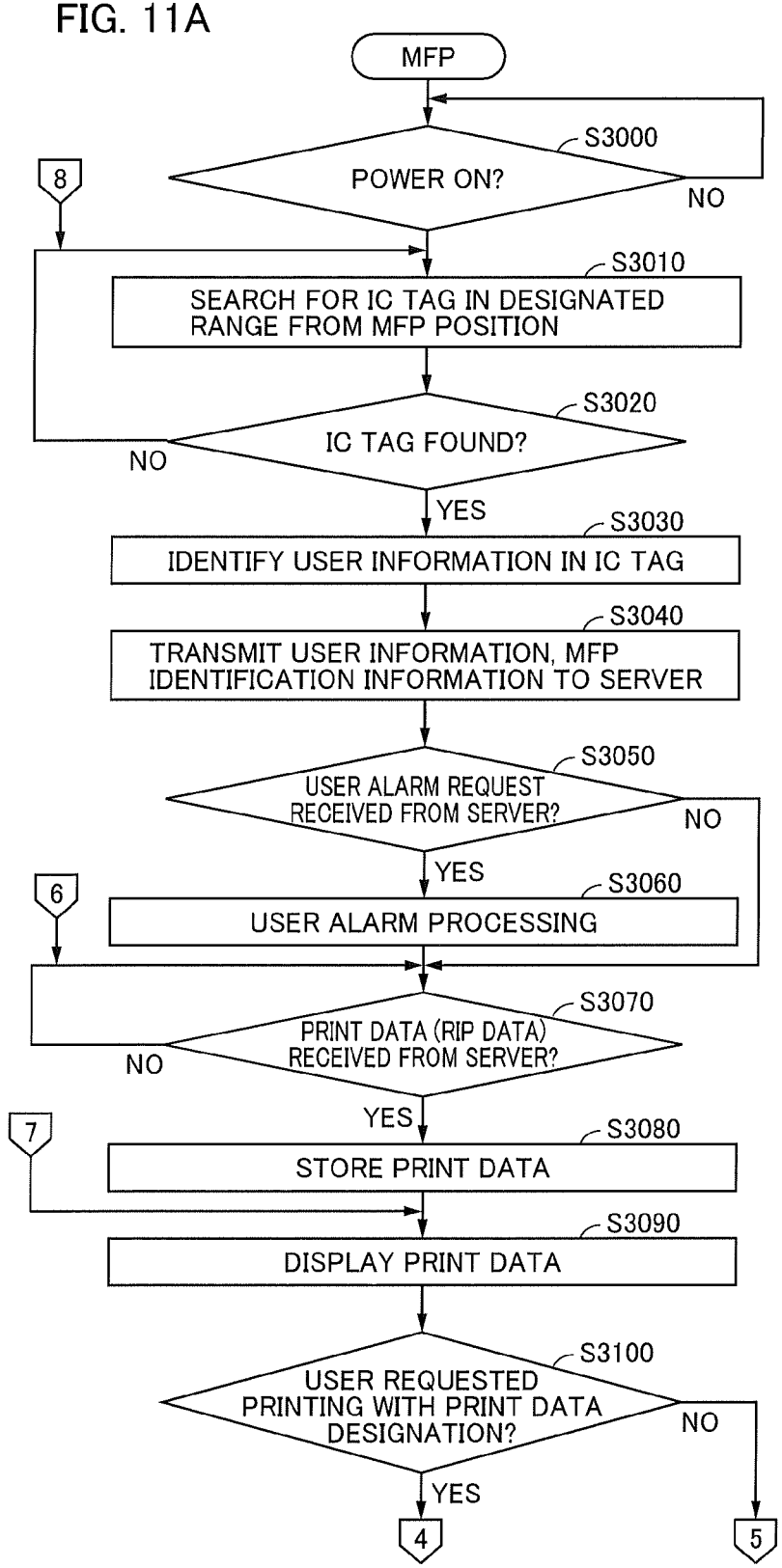
FIGS. 11A and 11B are flowcharts representing a control structure of an approaching-user-triggered program executed by the MFP.
Figure 11B:
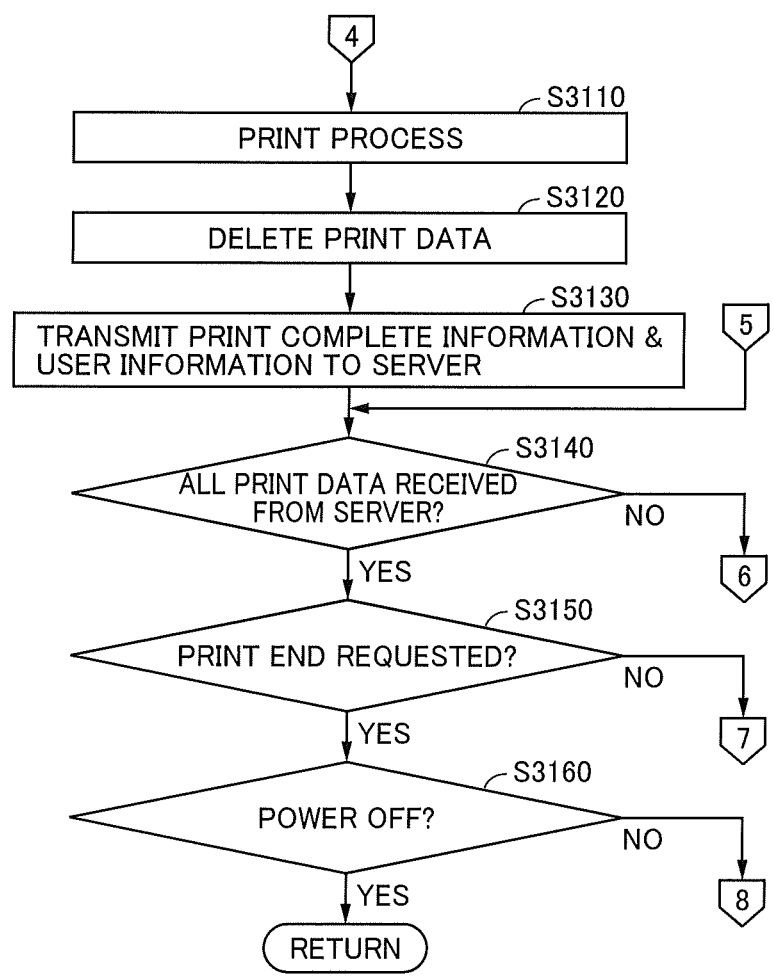

The program having the control structure shown in FIGS. 11A and 11B is executed by CPU 310 of MFP 300. At S3000, CPU 310 determines whether or not the power of MFP 300 is turned on. The main power of MFP 300 is always kept on, for example, for FAX reception. Therefore, power is always supplied to CPU 310. The process of S3000 is to detect whether or not the sub-power switch, provided close to touch-panel display 380 of MFP 300, is turned from OFF to ON. If the sub-power switch is turned ON, power supply to functional units other than the FAX receiving function starts, and normal operation becomes possible.

If the determination at S3000 becomes positive, the control proceeds to S3010. Otherwise, the control returns to S3000, and waits until the power of MFP 300 is turned ON.

At S3010, CPU 310 searches for any communicable IC tag, using IC tag communication unit 312. It is assumed that IC tag communication unit 312 can communicate only with an IC tag within a limited range with the position of MFP 300 being the center. At S3020, CPU 310 determines whether or not any IC tag is found in the range as a result of search. Here, CPU 310 searches out every communicable IC tag, using IC tag communication unit 312. In the following description, it is assumed that there is one IC tag in the designated range from MFP 300. If a plurality of IC tags exist, the following process may be executed successively for each IC tag. If the determination at S3020 is positive, the control proceeds to S3030. Otherwise, the control returns to S3010, and the search for an IC tag continues.

At S3030, CPU 310 identifies user information from the IC tag data searched out by IC tag communication unit 312. The control corresponds to the process executed by IC-tag user information identifying unit 310B shown in FIG. 4B.

At S3040, CPU 310 transmits the user information and the identification information of MFP to server 200. The process corresponds to the process executed by transmission/reception control unit 310E of FIG. 4B.

At S3050, CPU 310 determines whether or not a user alarm request signal is received from server 200. As will be described later, if the user alarm flag is ON with respect to the print data corresponding to the user information received from MFP 300 and the user alarm conditions for the user are all satisfied, server 200 transmits the user alarm request signal to MFP 300. If the determination at S3050 is positive, the control proceeds to S3060. Otherwise, the control proceeds to S3070.

At S3060, CPU 310 executes the user alarm process, using user alarm unit 314. The process corresponds to the process executed by user alarm unit 314 under the control of user alarm control unit 310D shown in FIG. 4B.

At S3070, CPU 310 determines whether or not the print data (RIP data) is received from server 200. Server 200 converts the print data that corresponds to the user information received from MFP 300 to RIP data fit for MFP 300, and transmits the converted RIP data to MFP 300. If the determination at S3070 is positive, the control proceeds to S3080. Otherwise, the control returns to S3070, and waits until it is determined that RIP data is received from server 200.

At S3080, CPU 310 stores the RIP data received from server 200 in hard disk 340. The process corresponds to the process executed by RIP data storage/deletion control unit 310C shown in FIG. 4B.

At S3090, CPU 310 displays the RIP data received from server 200 on touch-panel display 380 in a manner recognizable by the user.

At S3100, CPU 310 determines whether or not a print request designating data to be printed from the displayed print data is input by a user approaching MFP 300 is detected. By way of example, at S3090, on touch-panel display 380, software buttons corresponding to the names of RIP data, a "PRINT START" button and a "PRINT END" button are displayed. When the user presses a button corresponding to the name of desired RIP data, the RIP data is selected. When the user thereafter presses the "PRINT START" button, the determination at S3100 becomes positive. If the determination at S3100 is positive, the control proceeds to S3110. Otherwise, the control proceeds to S3140.

At S3110, CPU 310 forms an image on a sheet of recording paper using the RIP data of the designated print data. This process corresponds to the process executed by the image forming unit under the control of image formation (print) control unit 310A shown in FIG. 4B.

At S3120, CPU 310 deletes the print data (RIP data) of which printing has been completed, from hard disk 340. The process corresponds to the process executed by RIP data storage/deletion control unit 310C of FIG. 4B. When printing of a print data ends, an indication that it is already printed is displayed alongside the print data displayed on touch-panel display 380.

At S3130, CPU 310 transmits print complete information indicating end of printing to server 200, together with the information identifying the printed RIP data and the identification of the user who printed the data.

At S3140, CPU 310 determines whether or not all print data have been received from server 200. Server 200 transmits all RIP data converted from the print data of which print permission is given to the user approaching MFP 300, to MFP 300. Server 200 transmits the last RIP data with a flag indicating that the RIP data is the last data to be transmitted. If the determination at S3140 is positive, the control proceeds to S3150. Otherwise, the control returns to S3070.

At S3150, CPU 310 determines whether or not a request to end printing is detected. If the "PRINT END" button displayed on touch-panel display 380 is pressed, the determination is positive, and the control proceeds to S3160. Otherwise, the control returns to S3090.

At S3160, CPU 310 determines whether or not the power of MFP 300 is turned OFF. If the user turns OFF the sub-power switch of MFP 300, the determination at step S3160 becomes positive, and execution of this program ends. Otherwise, the control returns to S3010.

Figure 12:
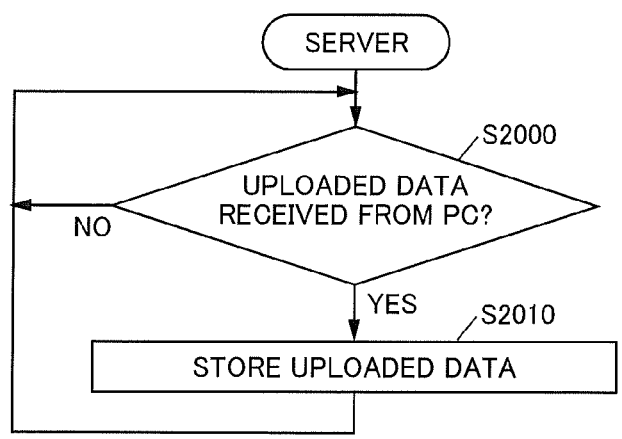
FIG. 12 is a flowchart representing a control structure of a print data accumulation program executed by the server.

The program having the control structure shown in FIG. 12 is executed by CPU 210 of server 200. The program stays resident in memory while server 200 is in operation. At S2000, CPU 210 determines whether or not data uploaded from client 100 is received. The data is transmitted from client 100 to server 200 at S1330 of FIG. 10, and the data includes print data and attribute information. If the determination at S2000 is positive, the control proceeds to S2010. Otherwise, the control returns to S2000, and waits until data is transmitted from client 100.

At S2010, CPU 210 stores the data transmitted from client 100 in hard disk 240. The process corresponds to the process executed by uploaded data storage/deletion control unit 210B shown in FIG. 3B. After S2010, the control returns to S2000, to wait until the next data is transmitted from client 100.

Figure 13A:
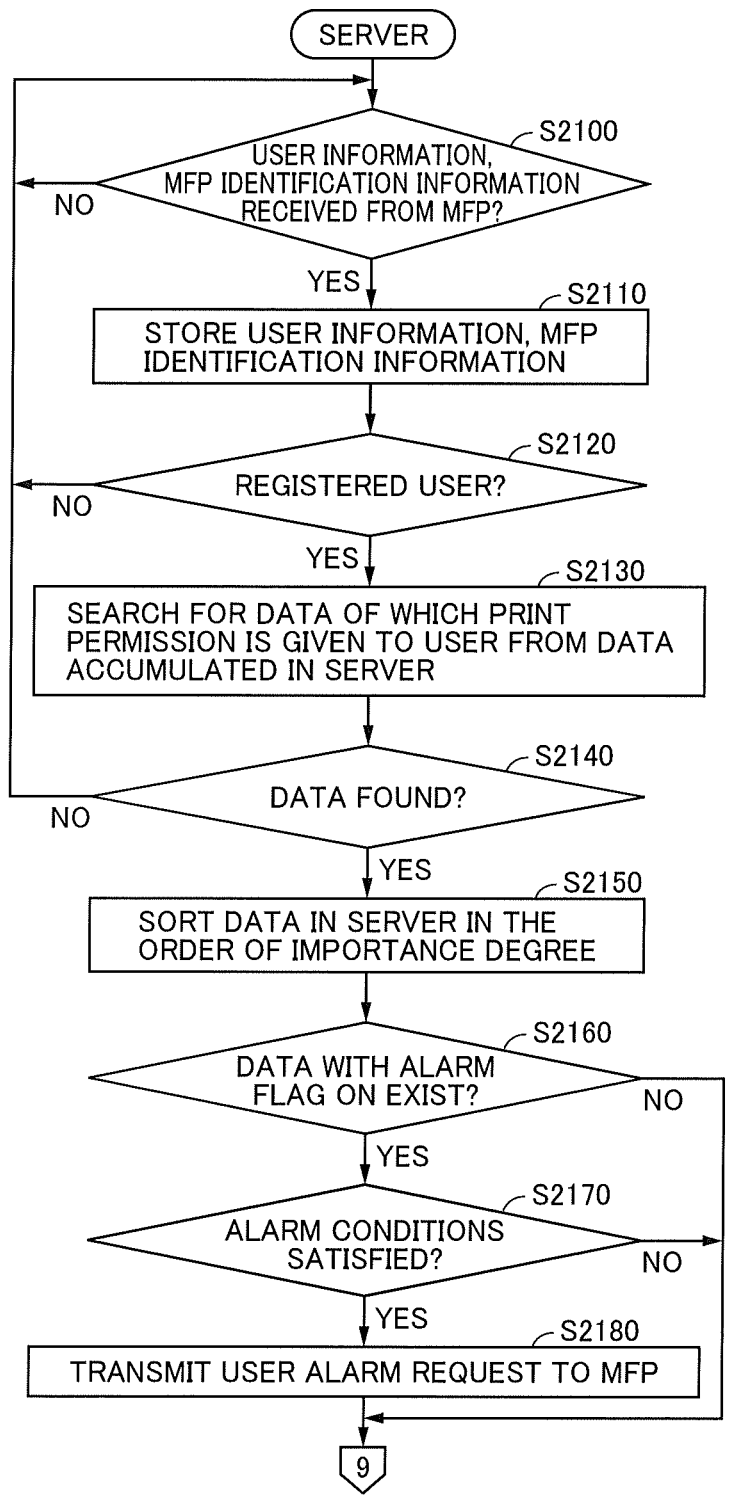
FIGS. 13A and 13B are flowcharts representing a control structure of a print data transmission program executed by the server.
Figure 13B:
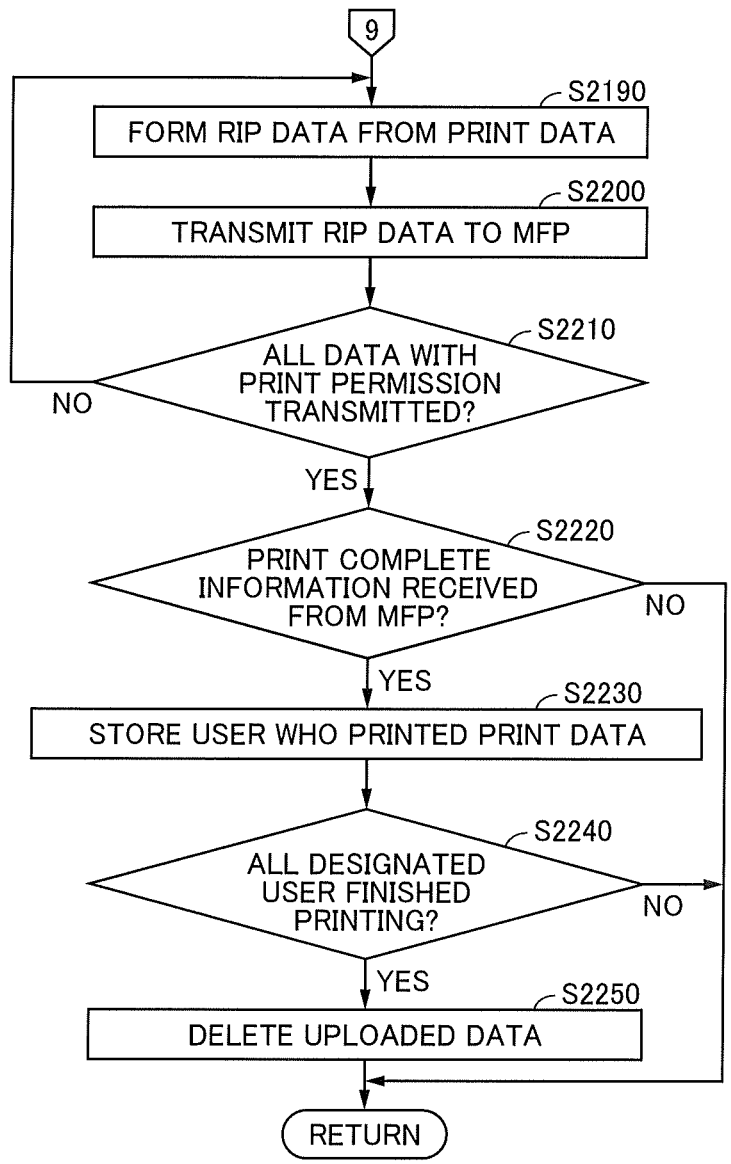

The program having the control structure shown in FIGS. 13A and 13B is also executed by CPU 210 of server 200. At S2100, CPU 210 determines whether or not the user information and the MFP identification information are received from MFP 300. The user information and the MFP identification information are data transmitted from client 100 to server 200 at S3040 of FIG. 11A. If the determination at S2100 is positive, the control proceeds to S2110. Otherwise, the control returns to S2100, and CPU 210 waits until it is determined that the user information and the MFP identification information are received from MFP 300.

At S2110, CPU 210 stores the user information and the MFP identification information received from MFP 300 in hard disk 240. At S2120, CPU 210 determines whether or not the user identified by the user information received from MFP 300 is permitted to use the network print system. The process corresponds to the process executed by registered user determining unit 210A shown in FIG. 3B. If the determination at S2120 is positive, the control proceeds to S2130. Otherwise, the process for the user is unnecessary. Therefore, the control returns to S2110, and CPU 210 waits until it is determined that other user information and MFP identification information are received from MFP 300.

At S2130, CPU 210 searches for print data of which print permission is given to the user, from the print data with attribute information, accumulated in hard disk 240 of server 200. The process corresponds to the process executed by data searching unit 210C of FIG. 3B.

At S2140, CPU 210 determines whether there is any print data of which print permission is given to the user. If the determination at S2140 is positive, the control proceeds to S2150. Otherwise, the control returns to S2110, and CPU 210 waits until it is determined that other user information and MFP identification information are received from MFP 300.

At S2150, CPU 210 sorts the print data of which print permission is given to the user in the order of degree of importance set in the attribute information. Print data with the degree of importance not set is placed on the bottom.

At S2160, CPU 210 determines whether or not there is any data of which alarm flag in the attribute information is ON, among the print data of which print permission is given to the user. If the determination at S2160 is positive, the control proceeds to S2170. Otherwise, the control proceeds to S2190.

At S2170, CPU 210 determines whether or not there is any print data of which alarm conditions in the attribute information are satisfied, among the print data having alarm flag ON and of which print permission is given to the user. The process corresponds to the process executed by alarm condition determining unit 210F of FIG. 3B. If the determination at S2170 is positive, the control proceeds to S2180. Otherwise, the control proceeds to S2190.

At S2180, CPU 210 transmits the user alarm request signal to MFP 300 as the transmission source of the user information.

At S2190, CPU 210 forms RIP data from the print data. The process corresponds to the process executed by RIP data forming unit 210E of FIG. 3B. Here, the RIP data are formed successively from the print data in the descending order of degree of importance.

At S2200, CPU 210 transmits the formed RIP data to MFP 300. Here, the RIP data are transmitted successively in the order of degree of importance to MFP 300. When the last RIP data is transmitted, a flag indicating that it is the last transmission data is added.

At S2210, CPU 210 determines whether or not all print data (RIP data), of which print permission is given to the user, stored in hard disk 240 have been transmitted to MFP 300. If the determination at S2210 is positive, the control proceeds to S2220. Otherwise, the control returns to S2190, at which the next print data is converted to RIP data and the converted data is transmitted to MFP 300.

At S2220, CPU 210 determines whether or not the print complete information is received from MFP 300. The print complete information includes information for identifying print data and the user information. The process corresponds to the process of S3130 shown in FIG. 11B. If the determination at S2220 is positive, the control proceeds to S2230. Otherwise, the execution of this program is terminated.

At S2230, CPU 210 stores the information identifying the user who printed the print data identified by the received print complete information, in hard disk 240. At S2240, CPU 210 determines whether or not the print data identified by the received print complete information has been printed by every user designated in relation to condition (F) for the print data. The processes of S2230 and S2240 correspond to the process executed by print complete data management unit 210D of FIG. 3B. If the determination at S2240 is positive, the control proceeds to S2250. Otherwise, execution of the program is terminated.

At S2250, CPU 210 deletes the uploaded data (print data and attribute information) corresponding to the print data identified by the received print complete information from hard disk 240. The process corresponds to the process executed by uploaded data storage/deletion control unit 210B shown in FIG. 3B.

[Operation]

The network print system in accordance with the present embodiment operates in the following manner.

Broadly speaking, the system operation has two phases. The first phase involves data formation and uploading to the server. The second phase involves a process triggered by an approaching user. In the following, printing of "Conference Material" shown in FIG. 8 will be described as an example of the document to be printed for the user.

<Print Data Forming Operation and Uploading Operation>

Assume that a user forms certain print data, and wishes to have the print data printed and obtained by another person in a limited time period by using a limited MFP 300. In such a situation, the user activates a document forming program in client 100 and forms the Conference Material as the certain print data (YES at S1000, S1010).

When formation of Conference Material ends (YES at S1020), the creator of the print data activates the printer driver, and requests user alarm for the print data (YES at S1030). In response, the alarm designation flag in the attribute information of the print data is set ON (S1040).

The creator of the print data sets the following for the print data.

The degree of importance related to condition (A) is set to the highest degree of "S" (YES at S1070).

The print period related to condition (D) is set to "13:00 to 15:00 of Aug. 12, 2009" (YES at S1100).

The printer related to condition (E) is set to "MFP in Conference Room" indicating MFP 300 installed in the conference room.

The target users related to condition (F) are set to "General Manager: Mr. A", "Manager: Ms. B", "Assistant Manager: Mr. C", "Sub-assistant Manager: Mr. D" and "Sub-assistant Manager: Ms. E" (YES at S1160).

The print data of Conference Material (for example, PDL data) is stored together with the date and time of data formation, alarm designation flag (ON), alarm conditions, and print permission, in hard disk 140 of client 100 (S1200). Here, it is assumed that the user sets that the print permission is given to "sub-assistant manager and his/her superior" (YES at S1190).

If the system administrator or the user who formed the print data requests uploading to server 200, the uploading program having the control structure shown in FIG. 10 is activated, and an image allowing designation of data to be uploaded is displayed on display 162 (S1310). If the user designates the path and file name of Conference Material as the data to be uploaded (YES at S1320), the print data of Conference Material (including the date and time of data formation, alarm designation flag (ON), alarm conditions, and print permission) is transmitted together with the attribute information additionally having the data of date and time of upload, to server 200 (S1330), as the uploaded data. As the attribute information, date and time of document data formation of Conference Material, alarm designation flag (ON), alarm conditions, print permission and date and time of uploading are set.

Receiving the uploaded data from client 100 (YES at S2000 of FIG. 12), server 200 stores the uploaded data in hard disk 240 (S2010).

The attribute data transmitted from client 100 to sever 200 in accordance with the conditions described above and stored in hard disk 240 of server 200 is as shown on the uppermost raw of FIG. 8.

<Print Operation Triggered by User Approaching MFP>

Assume that an MFP 300 is installed in a conference room, and the power, including the sub power, is ON.

When a user wearing an IC tag approaches MFP 300, MFP 300 and server 200 operate in the following manner. Assume that the user approaching MFP 300 is permitted to use the network print system, who is user (1) shown in FIG. 6. Here, the user (1) corresponds to "Sub-assistant Manager: Mr. D." Further, it is assumed that "General Manager: Mr. A", "Manager: Ms. B", "Assistant Manager: Mr. C", and "Sub-assistant Manager: Ms. E" other than "Sub-assistant Manger Mr. D" have already printed Conference Material.

When the user "Sub-assistant Manger Mr. D" approaches MFP 300 in the conference room (YES at S3010), the IC tag held by the user and IC tag communication unit 312 of MFP 300 start communication, and the user information in the IC tag is identified by IC tag communication unit 312 (S3030) and transmitted to server 200 (S3040).

In server 200, since the user information received from MFP 300 represents "Sub-assistant Manger Mr. D" (user (1)), it is determined that the user is permitted to use the system (YES at S2120), and print data of which print permission is given to the user (1) are searched. It is determined that the user has print permission of Conference Material (YES at S2140).

Beside the Conference Material, print data searched out from hard disk 240 of server 200 as the print data of which print permission is given to the user are sorted in the descending order of the degree of importance (S2150).

As regards the print data of Conference Material, it has the alarm flag set ON. Thus, the determination at S2160 is positive. At the following step S2170, whether or not alarm conditions are satisfied is determined.

The user is user (1) shown in FIG. 6. Referring to FIG. 6, the following alarm conditions are set in advance for user (1).

Specifically, in connection with condition (A), if the degree of importance set for the print data is S;

in connection with condition (B), if the date and time of data formation of the print data is Aug. 1, 2009 or later;

in connection with condition (C), if the date and time of uploading the print data is Aug. 1, 2009 or later;

in connection with condition (D), if the user approached MFP 300 in a period from Aug. 10, 2009 to Aug. 14, 2009;

in connection with condition (E), if the user approached MFP in the conference room or MFP of his/her department; and in connection with condition (F), if the user is set as the target user for the print data, alarm is given to the user to notify that the corresponding print data exists.

On the other hand, referring to FIG. 8, the attribute information of the print data of Conference Material is set as follows.

Specifically, print permission is given to sub-assistant manager and his/her superior;

alarm designation flag is ON;

degree of importance is "S";

date and time of formation of the print data is Aug. 8, 2009;

date and time of uploading the print data is Aug. 10, 2009;

as to condition (D), the time period of user approach is 13:00 to 15:00 on Aug. 12, 2009;

as to condition (E), the MFP is the MFP installed in the conference room;

as to condition (F), the target user include "General Manager: Mr. A", "Manager: Ms. B", "Assistant Manager: Mr. C", "Sub-assistant Manager: Mr. D" and "Sub-assistant Manager: Ms. E."

Whether or not the alarm conditions are satisfied between user (1) (Sub-assistant manager Mr. D) and the print data is determined by the following manner.

As to condition (A), the degree of importance set by the user is S or higher (FIG. 6), and the degree of importance of the print data of Conference Material is "S." Therefore, condition (A) is satisfied.

As to condition (B), the setting by the user is "date and time of data formation is Aug. 1, 2009 or later" and the date and time of data formation of the print data of Conference Material is Aug. 8, 2009. Therefore, condition (B) is satisfied.

As to condition (C), the setting by the user is "date and time of uploading the print data is Aug. 1, 2009 or later" and the date of uploading of the print data of Conference Material is Aug. 10, 2009. Therefore, condition (C) is satisfied.

As to condition (D), the setting by the user is "the user approaches MFP 300 in a period from Aug. 10, 2009 to Aug. 14, 2009" and the period set in the print data of Conference Material in connection with condition (D) is 13:00 to 15:00 on Aug. 12, 2009. Therefore, condition (D) is satisfied.

As to condition (E), it is set by user (1) that alarm is to be given if the user approaches MFP in the conference room or MFP in his department, and the printer set by the creator for the print data of Conference Material is MFP 300 installed in the conference room. Therefore, this condition is satisfied.

As to condition (F), the setting by user (1) is that "the user (user (1)) is recorded in the area related to condition (F) of the attribute information of print file" and the users set in relation to condition (F) by the creator for the print data of Conference Material are "General Manager: Mr. A", "Manager: Ms. B", "Assistant Manager: Mr. C", "Sub-assistant Manager: Mr. D" and "Sub-assistant Manager: Ms. E." Therefore, condition (F) is satisfied.

Since all conditions for user alarm are satisfied (YES at S2170), the user alarm request signal is transmitted from server 200 to MFP 300 (S2180).

When MFP 300 in the conference room receives the user alarm request signal (YES at S3050), the user alarm process is performed, which includes flickering of a small signal beacon provided on MFP 300 or sounding a buzzer (S3060). As a result, it is notified to user (1) (Sub-assistant manager Mr. D) that data corresponding to user (1) who approached MFP 300 exists in MFP 300.

In server 200, RIP data is formed from the print data of Conference Material (S2190), and the RIP data is transmitted to MFP 300 in the conference room (S2200). Such data conversion and transmitting operations are repeated for every print data of which print permission is given to user (1), in the descending order of degree of importance of the print data.

MFP 300 in the conference room receives the RIP data from server 200 (YES at S3070), and stores the data in a storage (S3080). The received print data are displayed on touch-panel display 380 (S3090). The RIP data are transmitted successively from server 200 to MFP 300 in the descending order of degree of importance and, therefore, names of print data corresponding to the received RIP data are successively displayed in the descending order of degree of importance, on touch-panel display 380.

Figure 14:
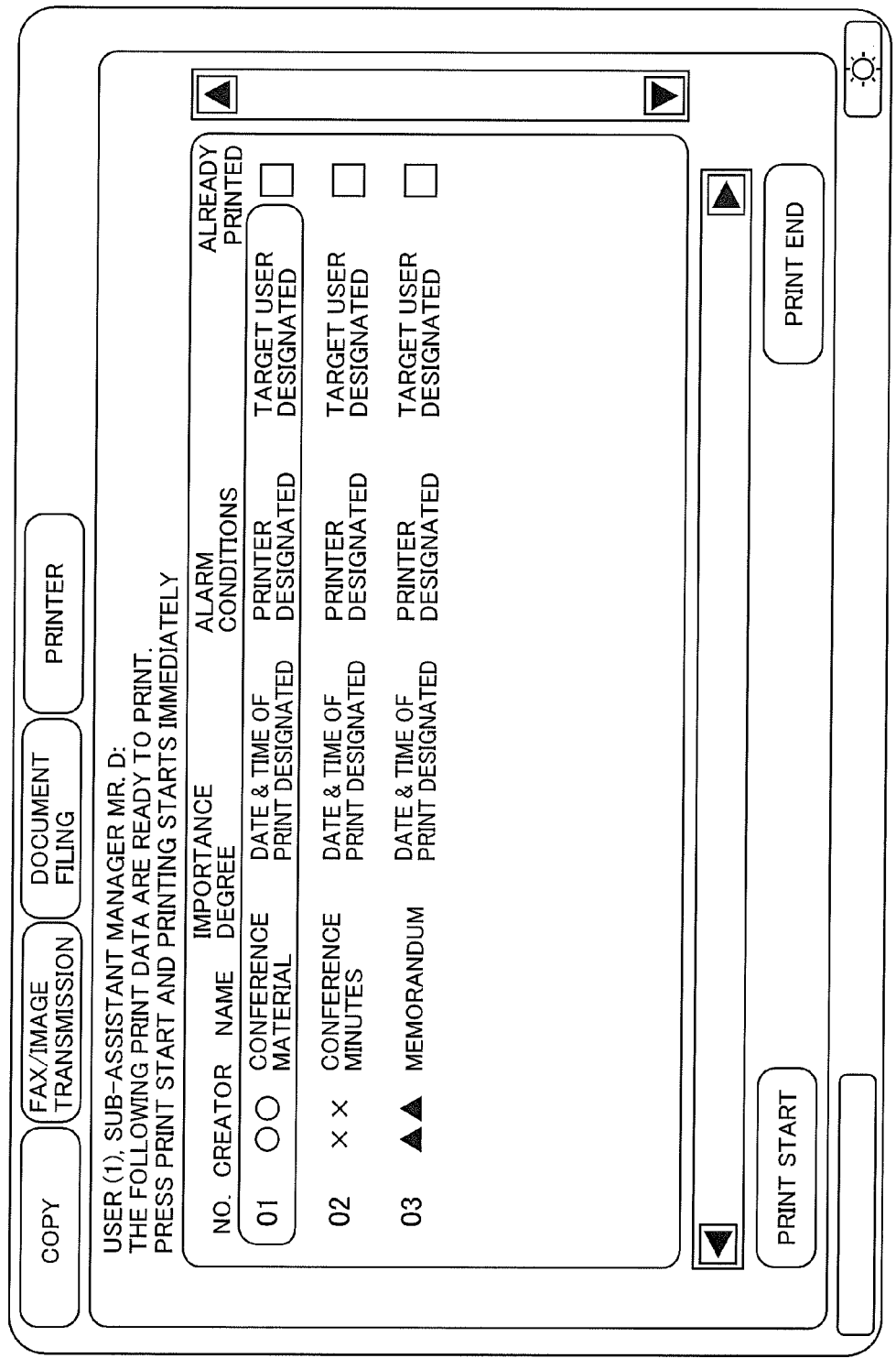
FIGS. 14 and 15 are exemplary images on a touch-panel display of the MFP when the program of FIGS. 11A and 11B is executed.

When user (1) (Sub-assistant manager Mr. D) approaches MFP 300 in the conference room, the small signal beacon provided on MFP 300 flickers or a buzzer sounds. Noticing such an alarm, Sub-assistant manager D would see touch-panel display 380 of MFP 300. On touch-panel display 380, a message for the user, such as "USER (1), SUB-ASSISTANT MANAGER MR. D: THE FOLLOWING PRINT DATA ARE READY TO PRINT. PRESS PRINT START AND PRINTING STARTS IMMEDIATELY" is displayed together with the "PRINT START" button. The name of each print data can be freely selected on the touch-panel. FIG. 14 shows an exemplary image.

If the user selects "Conference Material" displayed on touch-panel display 380 and presses "PRINT START" button (YES at S3110), Conference Material is printed (S3110). Since the RIP data corresponding to the print data of Conference Material has already been downloaded from server 200 to MFP 300, printing starts immediately in MFP 300. Thus, the print wait time can be reduced significantly.

Figure 15:
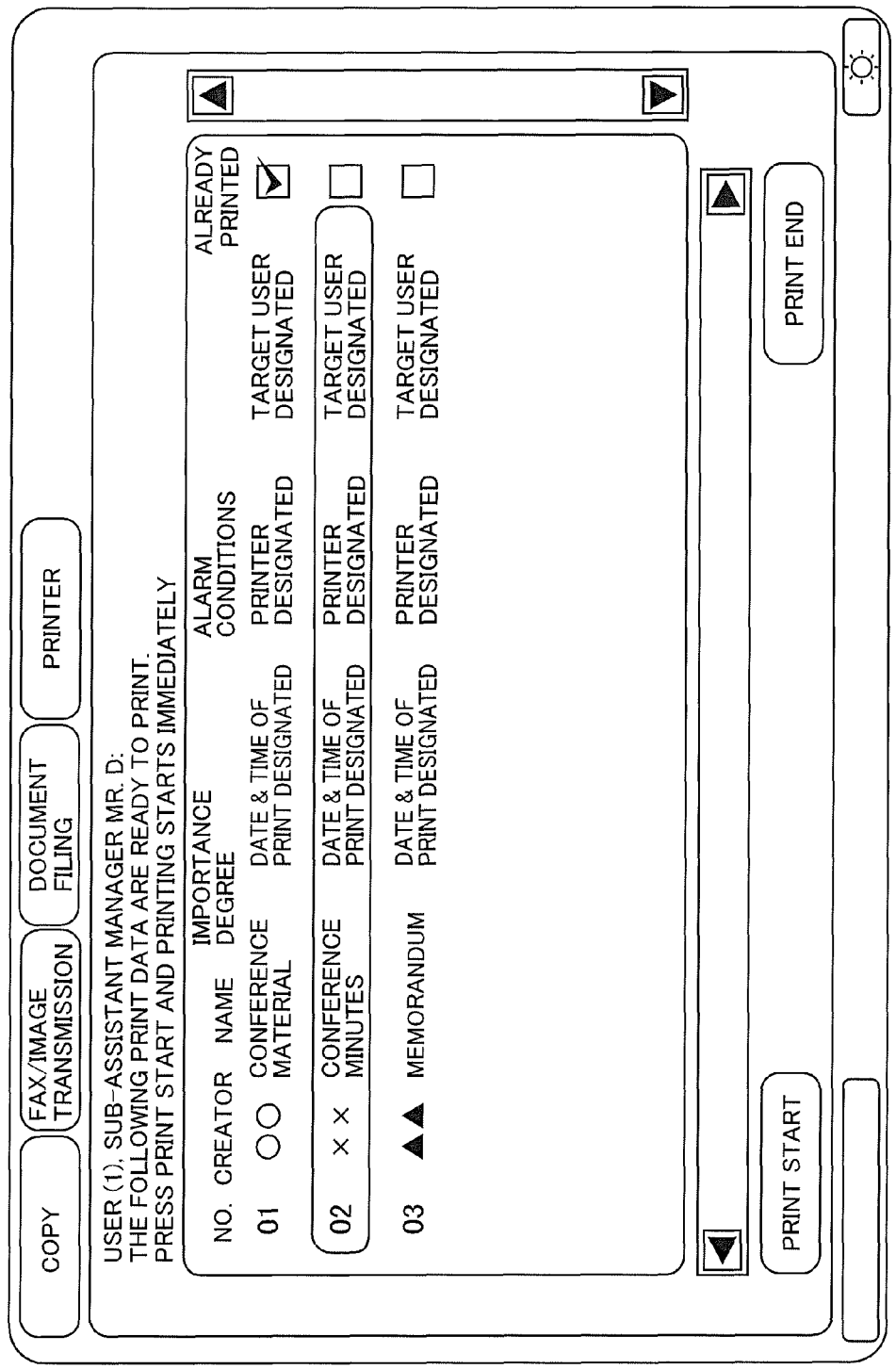

FIG. 15 shows an exemplary image displayed on touch-panel display 380 of MFP 300 installed in the conference room, when printing of Conference Material is completed. Referring to FIG. 15, Sub-assistant manager Mr. D as user (1) has already obtained the printout of Conference Material "01" and now he selects Conference Minutes of "02", so that printing of Conference Minutes of "02" is about to start. The "ALREADY PRINTED" check box of Conference Material "01" is checked.

When printing of Conference Material ends in MFP 300 in the conference room, the print data (RIP data) of Conference Material is deleted from hard disk 340 of MFP 300 (S3120), and print complete information indicating that "Conference Material" has been printed by "Sub-assistant manager Mr. D" as user (1) is transmitted to server 200 (S3130).

Receiving the print complete information (YES at S2220), server 200 performs a process of recording end of printing by Sub-assistant manager Mr. D of "Conference Material", of which printing is completed. As described above, "General Manager: Mr. A", "Manager: Ms. B", "Assistant Manager: Mr. C", and "Sub-assistant Manager: Ms. E" other than "Sub-assistant Manager: Mr. D" as user (1) have already printed Conference Material. Therefore, it is determined that target users set for the print data of Conference Material have all completed printing (YES at S2240). Therefore, the data (print data, attribute information) uploaded to server 200 in relation to Conference Material are deleted from hard disk 240 of server 200.

As described above, by the network print system in accordance with the embodiment of the present invention, (1) if a user permitted to print uploaded data accumulated in the server simply approaches the MFP, the server forms RIP data from the print data to be printed by the user, and the MFP downloads the RIP data from the server. It is unnecessary for the user to log-in beforehand, and when the user simply comes closer to the MFP, printing using RIP data can be executed without log-in. (2) When user alarm conditions set for the print data accumulated in the server are all satisfied, an alarm is given when the user simply comes closer to the MFP, to notify the user that print data to be printed by the MFP exists in the MFP. Even if the user approaching the MFP is unaware of the existence of such print data, it is possible to have the user intended by the creator of the date print the specific print data.

<Modification>

The embodiment described above may be modified in the following manner if print permission is given to a user other than the creator. If the creator printed using the print data by MFP 300, the fact that the printing is done with the print data by the creator himself/herself may be notified to the user intended by the creator. Here, by way of example, in addition to or in place of the "ALREADY PRINTED" check box displayed on the touch-panel display of MFP, a check box of "PRINTED BY DATA CREATOR" may be provided.

In order to ensure security of printing, it may be desirable to appropriately add to the process shown in FIGS. 11A and 11B a process of transmitting a print authentication request from the MFP to an authentication apparatus (for example, server 200) and executing printing by the MFP only after the printing is authorized by the authentication apparatus. In such a case also, the RIP data is downloaded in advance from server 200 to MFP 300 and, therefore, print wait time can significantly be reduced.

In the embodiment described above, if the alarm conditions for a certain user are satisfied on even one of the print data uploaded to server 200, all print data of which print permission is given to the user are transmitted to MFP (S2190 to S2210 of FIG. 13). Therefore, it is possible for the user to print the print data even if alarm conditions for the print data are not satisfied. The present invention, however, is not limited to such an embodiment. When the alarm conditions described above are satisfied, printing of only the corresponding print data may be permitted. Specifically, printing of only the print data of which print permission is given to the user and for which alarm conditions are satisfied may be permitted. Such an approach is effective if secure printing is desired, or if the number of print data uploaded to server 200 is large. If such an approach is taken, only the print data for which alarm conditions are satisfied are displayed as candidates on the touch-panel display of MFP. Therefore, the number of print data can be reduced, and it becomes easier for the user to select desired print data.

In the network print system in accordance with the present embodiment, word processor document and the like are converted by the printer driver installed in the client to PDL data, and the data are transmitted to the server. The present invention, however, is not limited to such an embodiment. The system may have the word processor document and the like stored as they are in the server without converting to the PDL data, allowing edition. Such documents may be edited by the server as needed, converted to PDL data, and developed to RIP data. Specifically, in the present embodiment, the data used for image formation that are transmitted (uploaded) from the client to the server or transmitted (downloaded) from the server to the MFP are not limited to data of any specific format.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus used in a network image forming system, said system including the image forming apparatus, a server computer accumulating image forming jobs and transmitting data of accumulated image forming job corresponding to user information received from said image forming apparatus to the image forming apparatus that transmitted said user information, and a client computer forming an image forming job and transmitting the job to said server computer;

said image forming apparatus comprising:
a communication device receiving user information by noncontact communication in a predetermined range;
a transmitting device transmitting the user information received by said communication device to said server computer;
a receiving device receiving data necessary for image formation by itself from said server computer;
an image forming unit forming an image using the data received by said receiving device from said server computer; and
an alarm device for giving alarm information, upon receipt of an instruction form said server computer to give an alarm that an image data to be formed exists to a user approaching and entering said range, in response to transmission of said received user information to said server computer.

2. The image forming apparatus according to claim 1, wherein said communication device includes an IC tag reader.

3. The image forming apparatus according to claim 2, further comprising a presenting device that presents information recommending image formation and information specifying data necessary for said image formation to a user approaching and entering said range, when said receiving device receives said data necessary for image formation after the alarm information is given by the alarm device.

4. The image forming apparatus according to claim 3, wherein said alarm device includes an information display device displaying information to a user reaching said image forming apparatus.

5. The image forming apparatus according to claim 1, wherein said alarm device includes a sensory stimulating device giving alarm information to a user by stimulating visual or auditory sense of the user.

6. A non-transitory computer-readable recording medium storing a computer program causing, when executed by a computer, said computer to operate as said image forming apparatus according to claim 1.

* * * * *